US012772265B2

(12) United States Patent
Hu et al.

(10) Patent No.: US 12,772,265 B2
(45) Date of Patent: Oct. 20, 2026

(54) SYSTEMS AND METHODS FOR MULTICAST TRANSMISSION MAPPING FOR REDUCED CAPABILITY USER EQUIPMENT

(71) Applicant: ZTE Corporation, Shenzhen (CN)

(72) Inventors: Youjun Hu, Shenzhen (CN); Bo Dai, Shenzhen (CN); Huiying Fang, Shenzhen (CN); Luanjian Bian, Shenzhen (CN); Kun Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 279 days.

(21) Appl. No.: 18/353,013

(22) Filed: Jul. 14, 2023

(65) Prior Publication Data

US 2023/0403727 A1 Dec. 14, 2023

Related U.S. Application Data

(63) Continuation of application No. PCT/CN2021/103391, filed on Jun. 30, 2021.

(51) Int. Cl.

| | |
|---|---|
| ***H04W 72/30*** | (2023.01) |
| ***H04W 72/0457*** | (2023.01) |
| ***H04W 72/1273*** | (2023.01) |
| ***H04W 72/232*** | (2023.01) |

(52) U.S. Cl.

CPC ....... *H04W 72/30* (2023.01); *H04W 72/0457* (2023.01); *H04W 72/1273* (2013.01); *H04W 72/232* (2023.01)

(58) Field of Classification Search

CPC .. H04L 5/0048; H04W 48/10; H04W 72/005; H04W 72/30; H04W 72/0457; H04W 72/232; H04W 72/1273

See application file for complete search history.

(56) References Cited

U.S. PATENT DOCUMENTS

| | | | |
|---|---|---|---|
| 11,659,570 B2 * | 5/2023 | Papasakellariou .... | H04L 1/0038 370/329 |
| 2011/0070905 A1 * | 3/2011 | Kazmi .................. | H04W 72/30 455/507 |

(Continued)

FOREIGN PATENT DOCUMENTS

| | | |
|---|---|---|
| CN | 110574331 A | 12/2019 |
| CN | 110832931 A | 2/2020 |

(Continued)

OTHER PUBLICATIONS

International Search Report and Written Opinion for PCT Appl. No. PCT/CN2021/103391, mailed Mar. 28, 2022 (8 pages).

(Continued)

*Primary Examiner* — Khaled M Kassim

(74) *Attorney, Agent, or Firm* — Foley & Lardner

(57) ABSTRACT

A wireless communication method includes configuring, by a wireless communication node, a first bandwidth part (BWP) to a first User Equipment (UE), wherein a multicast control channel (MCCH) for the first UE is transmitted in the first BWP; and configuring, by the wireless communication node, a second BWP to the first UE, wherein a multicast traffic channel (MTCH) for the first UE is transmitted in the second BWP.

18 Claims, 11 Drawing Sheets

(56) References Cited

U.S. PATENT DOCUMENTS

2013/0235820 A1* 9/2013 Wu ........................ H04W 72/02
455/410
2016/0066345 A1* 3/2016 Sun ........................ H04J 11/004
370/329
2017/0295005 A1 10/2017 Lee et al.
2019/0306848 A1* 10/2019 Zhou ..................... H04W 72/23
2020/0029314 A1* 1/2020 Niu ........................ H04L 5/0094
2020/0120642 A1 4/2020 Hwang et al.
2020/0162207 A1 5/2020 Hwang et al.
2020/0162208 A1* 5/2020 Moon ................... H04W 72/23
2020/0187170 A1 6/2020 Shin et al.
2020/0221495 A1* 7/2020 Chen ................. H04W 36/0058
2021/0037500 A1* 2/2021 Liu .......................... H04L 1/189
2021/0127396 A1* 4/2021 Su .......................... H04L 5/0094
2021/0176681 A1* 6/2021 Ozturk .............. H04W 36/0005
2021/0250958 A1* 8/2021 Liu ........................ H04L 5/0037
2022/0045827 A1* 2/2022 Lee ........................ H04W 72/30
2022/0046587 A1* 2/2022 Rico Alvarino ...... H04L 1/1896
2022/0046689 A1* 2/2022 Lee ........................ H04L 5/0053
2022/0046690 A1* 2/2022 Lee .......................... H04W 4/08
2022/0231818 A1* 7/2022 Lee ........................ H04L 5/0055
2022/0232403 A1* 7/2022 Lee ........................ H04W 24/08
2022/0232609 A1* 7/2022 Lee ...................... H04W 72/569
2022/0239428 A1* 7/2022 Lee ........................ H04L 5/0048
2022/0353883 A1* 11/2022 Zhao ................... H04W 72/569
2022/0361197 A1* 11/2022 Wang .................... H04L 1/1812
2023/0030951 A1* 2/2023 Takeda .................. H04L 5/0094
2023/0049535 A1* 2/2023 Wang .................. H04W 72/232
2023/0049784 A1* 2/2023 Lee ........................ H04L 1/1812
2023/0224930 A1* 7/2023 Huang ...................... H04L 1/08
370/312
2023/0284218 A1* 9/2023 Chou ................ H04W 72/0446
370/329
2024/0049270 A1* 2/2024 Su .......................... H04W 72/53
2024/0098760 A1* 3/2024 Abotabl ..................... H04L 5/14
2024/0107546 A1* 3/2024 Tsai ....................... H04W 72/23
2024/0205709 A1* 6/2024 Zheng ............... H04W 72/0457
2024/0215052 A1* 6/2024 Mohammed Mikaeil ...................
H04W 4/06
2024/0323959 A1* 9/2024 Sengupta ................ H04W 4/06
2025/0227735 A1* 7/2025 Babaei .................. H04W 48/12

FOREIGN PATENT DOCUMENTS

WO WO-2020/248918 A1 12/2020
WO WO-2021/109478 A1 6/2021
WO WO-2021/112740 A1 6/2021

OTHER PUBLICATIONS

Nokia et al., "Basic Functions for Broadcast / Multicast for RRC_ IDLE /RRC_INACTIVe UEs" 3GPP TSG RAN WG1 Meeting #105-e, R1-2104552, May 27, 2021, e-Meeting (14 pages).
Extended European Search Report for EP Appl. No. 21947502.7, dated Feb. 23, 2024 (69 pages).
ZTE, "Discussion on basic Functions for Broadcast or Multicast for RRC_IDLE or RRC_INACTIVE UEs", 3GPP TSG RAN WG1 #105-e, R1-2104338, May 27, 2021, e-Meeting (16 pages).
First Office Action for CN Appl. No. 202180095074.6, dated Jul. 10, 2026 (with English translation, 20 pages).

* cited by examiner

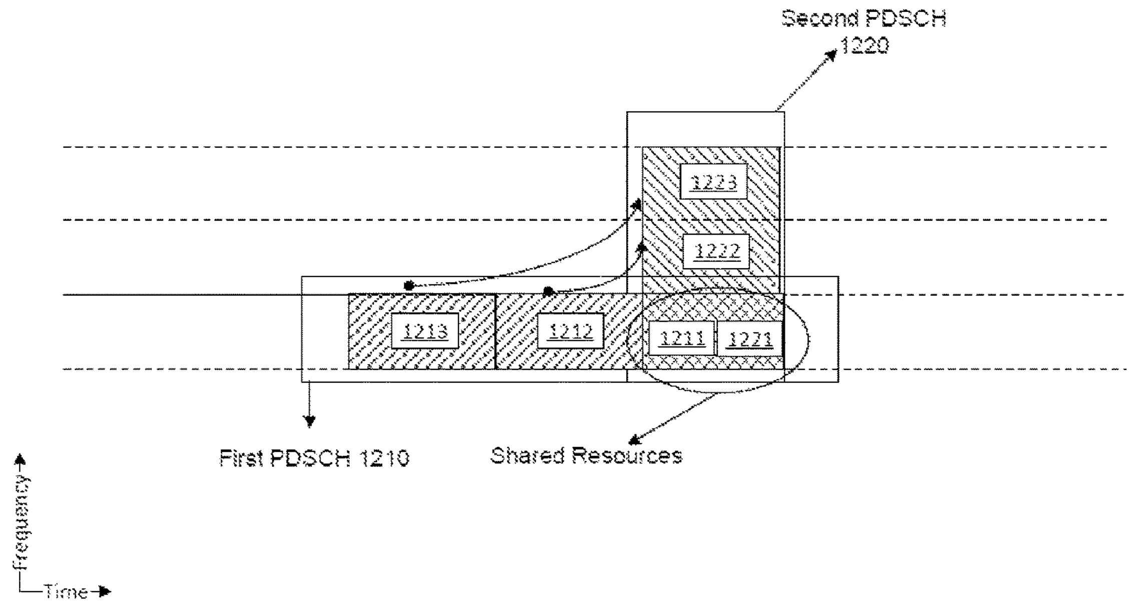
FIG. 12
FIG. 13
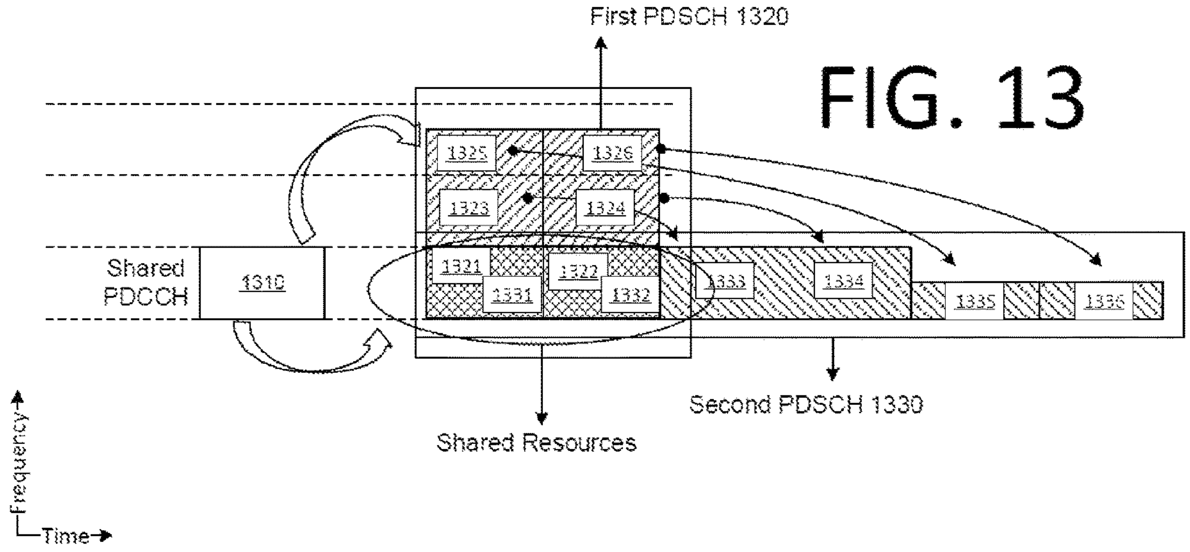

SYSTEMS AND METHODS FOR MULTICAST TRANSMISSION MAPPING FOR REDUCED CAPABILITY USER EQUIPMENT

CROSS-REFERENCE TO RELATED APPLICATION

This application claims the benefit of priority under 35 U.S.C. § 120 as a continuation of PCT Patent Application No. PCT/CN2021/103391, filed on Jun. 30, 2021, the disclosure of which is incorporated herein by reference in its entirety.

TECHNICAL FIELD

The disclosure relates generally to wireless communications and, more particularly, to systems and methods for multicast transmission mapping for reduced capability user equipment.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some arrangements, a Base Station (BS) performs a method including configuring a first bandwidth part (BWP) to a first User Equipment (UE), wherein a multicast control channel (MCCH) for the first UE is transmitted in the first BWP; and configuring a second BWP to the first UE, wherein a multicast traffic channel (MTCH) for the first UE is transmitted in the second BWP. In other arrangements, a first UE performs a method including receiving a multicast control channel (MCCH) in a first bandwidth part (BWP); and receiving a multicast traffic channel (MTCH) in a second BWP. In yet other embodiments, a wireless communications apparatus comprising a processor and a memory, wherein the processor is configured to read code from the memory and implement a method including configuring a first BWP to a first UE, wherein a MCCH for the first UE is transmitted in the first BWP; and configuring a second BWP to the first UE, wherein a MTCH for the first UE is transmitted in the second BWP. In further embodiments, a computer program product comprising a computer-readable program medium code stored thereupon, the code, when executed by a processor, causing the processor to implement a method including configuring a first BWP to a first UE, wherein a MCCH for the first UE is transmitted in the first BWP; and configuring a second BWP to the first UE, wherein a MTCH for the first UE is transmitted in the second BWP.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 12 is an example schematic of non-overlapping PDSCHs, according to various arrangements.

FIG. 13 is an example schematic of overlapping PDSCHs in a repetition scheme, according to various arrangements.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In current 5G New Radio (NR) systems with multicast services, a Physical Downlink Control Channel (PDCCH) can be utilized to schedule (or trigger, prompt, configure, etc.) Physical Downlink Shared Channel (PDSCH) for a NR User Equipment (UE). However, for a UE with reduced capability (e.g., RedCap UE), sharing the same PDCCH and PDSCH for the NR UE and the RedCap UE is problematic due to the RedCap UE's limited bandwidth. In order to address this issue, multicast services are utilized to share one or both of the PDCCH and PDSCH (or to share neither at all) or share the BWP. As used herein, the RedCap UE is referred to as a first UE, and the NR UE is referred to as a second UE.

In multicast transmission, MTCH carries the traffic data, and MCCH is for conveying the control message. In NR multicast, MTCH and MCCH are transmitted in a same BWP. For MTCH or MCCH transmission, at least a PDCCH is needed to schedule a PDSCH that contains the MCCH or MTCH info. Due to limitations of the RedCap UE (the first UE), an additional BandWidth Part (BWP) is configured for the RedCap UE specifically for MTCH scheduling. For example, the MCCH scheduling for the PDCCH and the PDSCH would share the same BWP, but a separate BWP is configured for the MTCH scheduling. This second BWP may also be shared by the RedCap UE and the NR UE, and is indicated by information in the MCCH or is configured by higher layer parameter. Each of the BWPs is configured for the UEs (either RedCap or NR) by a Base Station (BS). Once the BWPs are configured, a MCCH is transmitted to the UE on the first BWP, and a MTCH is then transmitted on the second (separate) BWP.

Figure 1:
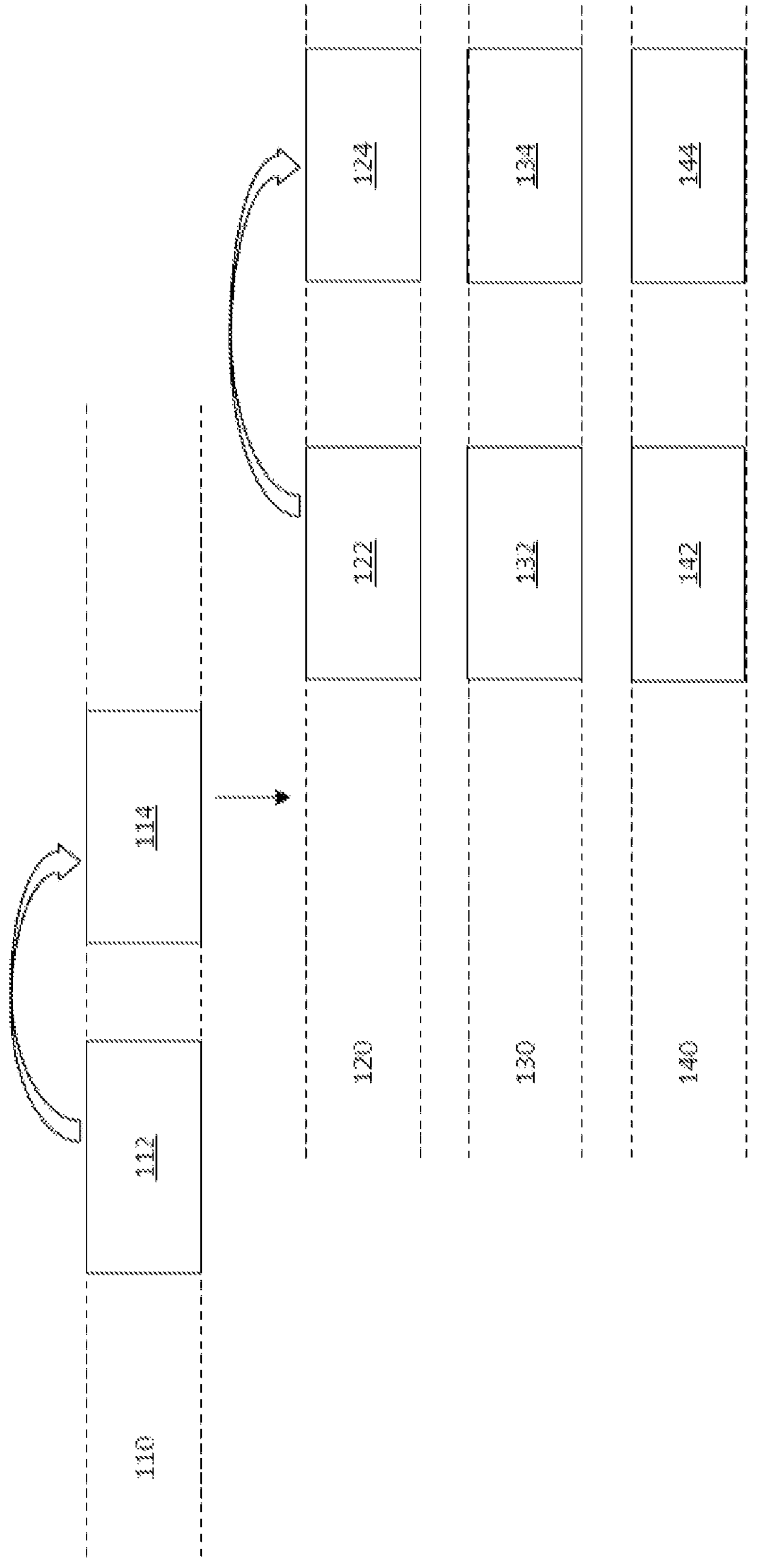
FIG. 1 is an example schematic of Bandwidth Part (BWP) configuration, according to various arrangements.

FIG. 1 is an example schematic 100 of BWP configuration, according to various arrangements. As shown in FIG. 1, a first BWP 110 is configured for MCCH scheduling. The MCCH scheduling corresponds to a first PDCCH 112 and a first PDSCH 114. In some embodiments, the first BWP 110 is shared for both a first UE (e.g., the RedCap UE) and a second UE (e.g., the NR UE). A second BWP 120 is configured for MTCH scheduling. The MTCH scheduling corresponds to a second PDCCH 122, and a second PDSCH 124. As shown, the first BWP 110 and second BWP 120 are separately configured for RedCap UE. Furthermore, as shown in FIG. 1, a third BWP 130 may be configured and used by the NR UE to transmit a MTCH, and a fourth BWP 140 may be configured and used by the RedCap UE for unicast transmission. The third BWP 130 is used to transmit a third PDCCH 132 and a third PDSCH, and the fourth BWP 140 is used to transmit a fourth PDCCH 142 and a fourth PDSCH. The third BWP 130 is different than each of the first BWP 110 and the second BWP 120 and is dependent on gNB configuration.

The BS configures at least two signaling/configurations: a first configuration for the first BWP, and a second configuration for the second BWP. Indication for the configurations may be in system information, indicated by Downlink Control Information (DCI), or by high/higher layer parameters, such as via Radio Resource Control (RRC) signaling or Medium Access Control Element (MAC CE) signaling. In some embodiments, the first BWP is shared (e.g., a shared BWP configuration) between the RedCap UE and the NR UE, such that the NR UE and RedCap UE utilize the configuration of the first BWP to transmit a MCCH. For example, the first BWP is shared to transmit the MCCH. The second BWP may be shared/not shared to transmit the MTCH. In other embodiments, the second BWP is shared between the RedCap UE and the NR UE, such that the NR UE utilizes the configuration of the second BWP to transmit a MTCH. For example, the second BWP is shared to transmit the MTCH. The first BWP may be shared/not shared to transmit the MCCH. In further embodiments, the first BWP and the second BWP are shared between the RedCap UE and the NR UE, such that the NR UE utilizes the configuration of the first and second BWP to transmit a MCCH and a MTCH. As used herein, 'share' refers to having the same configuration, so when a BWP is shared between the RedCap UE and the NR UE, it means that a BWP is configured for the NR UE with the same configuration as the RedCap UE BWP.

Once the BWPs have been configured, the UEs receives the MCCH and MTCH on the configured BWPs. As discussed above, there are 2 separate signaling/configurations to receive: a first signaling/configuration for the first BWP and another signaling/configuration for the second BWP. Indication for the configurations may be in system information, indicated by Downlink Control Information (DCI), or by high/higher layer parameters, such as via RRC signaling or MAC CE signaling.

Figure 2:
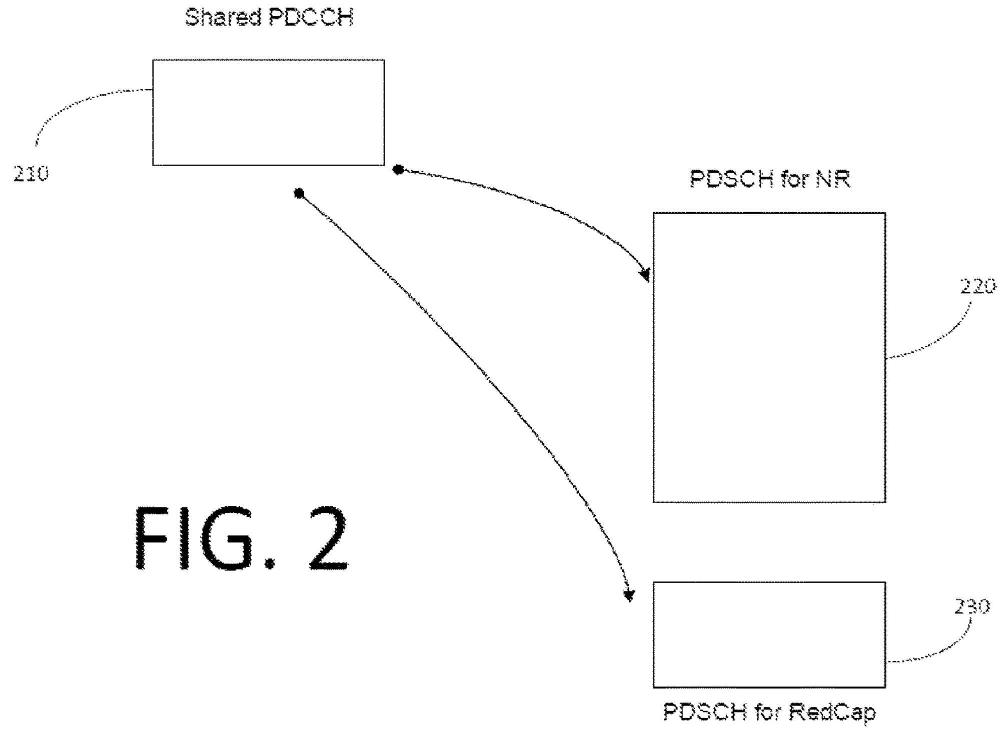
FIG. 2 is an example schematic of a Physical Downlink Control Channel (PDCCH) scheduling multiple Physical Downlink Scheduling Channels (PDSCHs), according to various arrangements.

In some implementations, one or more PDSCHs to different UEs are scheduled by DCI mapping to (e.g., transmitting via) a single PDCCH, e.g., once/after the BWPs have been configured by the BS. FIG. 2 is an example schematic 200 (e.g., representation) of a PDCCH scheduling multiple PDSCHs, according to various arrangements. As shown in FIG. 2, a shared PDCCH 210 corresponds (or is associated) with a first PDSCH 220 and a second PDSCH 230. The first PDSCH 220 is transmitted to the first UE (e.g., the RedCap UE), and the second PDSCH 230 is transmitted to the second UE (e.g.g., the NR UE). If the PDCCH is shared, a maximum value for the bandwidth of the shared PDCCH is determined by a UE maximum bandwidth or a Frequency Range (FR) (e.g., 20 MHz for FR1, 100 MHz for FR2, etc.)

In one example, a first PDSCH is transmitted on a first resource set to the first UE (e.g.g., RedCap UE), and a second PDSCH is transmitted on a second resource set to the second UE (e.g., the NR UE). In this example, the first resource set at least partially (or entirely) shares resources with the second resource set, such that the first and second resource sets overlap in one or both of the time domain and the frequency domain. These shared resources include (e.g., represents, implies, indicates) transmission of the same data to both the RedCap UE and the NR UE. These same data may be multiplexed symbols, modulated symbols, complex-valued symbols etc., or contain the same information or have the same resources/REs.

The first resource set of the first PDSCH is mapped onto Y portions of the time domain. Resources within each of the Y portions are allocated: a) in a single slot; b) in a single slot with a single repetition; c) in multiple slots with a single repetition; or d) across multiple slots with multiple repetitions, with the number of slots being greater than the number of repetitions (e.g., 3 slots and 2 repetitions). In some embodiments, the value for Y is based on a bandwidth of the second resource set, given as L, and a bandwidth of the shared resources, given as X. This relationship may be defined/represented as $Y=\lceil L/X \rceil$, such that the number of portions is equal to the bandwidth of the second resource set (associated with the second PDSCH) divided by the bandwidth of the shared resources. In some embodiments, the Y portions are transmitted/located continuously, while in other embodiments, a gap is present between each pair of adjacent portions. Indication of either continuous or gapped (e.g., discontinuous) transmission is indicated by DCI or by high/higher layer parameters, such as via RRC signaling or MAC CE signaling. In some embodiments, each of the Y portions have/include the same symbol positions/patterns in a corresponding slot or multiple slots, while in other embodiments, each of the Y portions has a same bandwidth, or first $Y-1$ portions has a same bandwidth and last portion is the same or is different.

Figure 3:
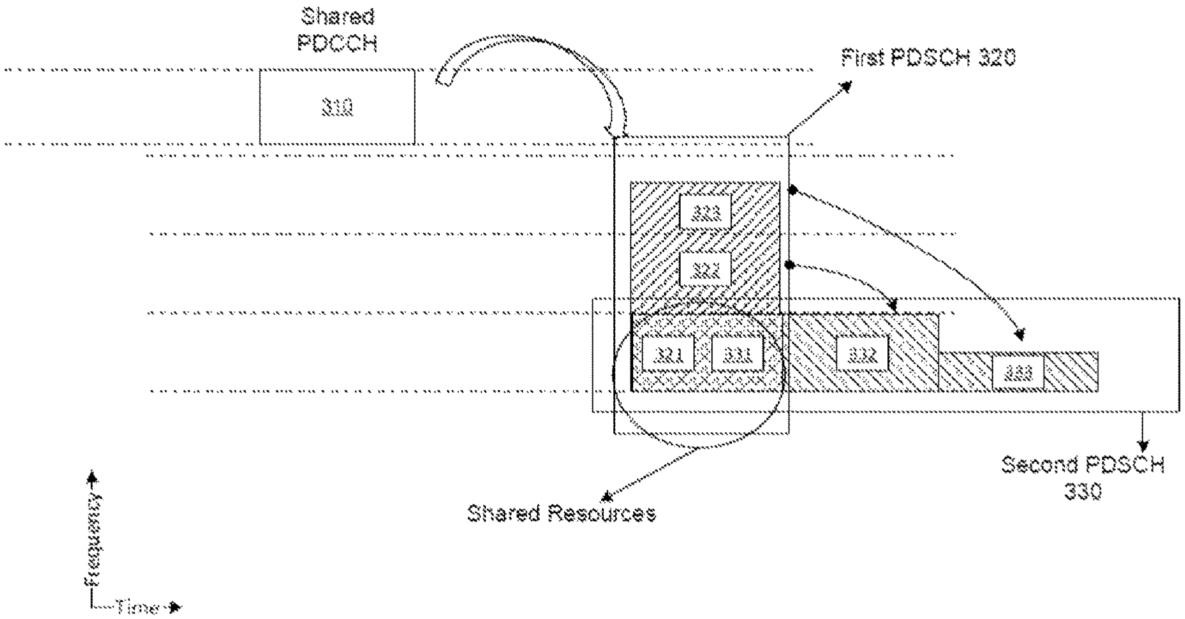
FIG. 3 is an example schematic (e.g., time and frequency domain representation) of overlapping PDSCHs, according to various arrangements.

FIG. 3 is an example schematic 300 (e.g., time and frequency domain representation) of overlapping PDSCHs, according to various arrangements. In the schematic 300, the x-axis is the time domain, and the y-axis is the frequency domain. As shown in FIG. 3, a shared/single PDCCH 310 schedules a first PDSCH 320 and a second PDSCH 330. The first PDSCH 320 includes Resource Elements (REs) 321-323 and is transmitted to the NR UE, and the second PDSCH 330 includes REs 331-333 and is transmitted to the RedCap UE. The first PDSCH 320 and the second PDSCH 330 partially overlap in both the frequency domain and the time domain, as RE 321 and RE 331 share the same slot(s) and bandwidth frequency, and are shared resources. Furthermore, RE 321 corresponds with (e.g., is mapped to) RE 331, RE 322 corresponds with RE 332, and RE 323 corresponds with RE 333, such that REs 321 and 331, 322 and 332, and 323 and 333, carry the same data (and/or the same symbol position/pattern) within each pair. The second PDSCH is more spread out over the time domain (e.g., the same amount of REs are transmitted over more slots) due to the limitations (e.g., bandwidth limitations) of the RedCap UE.

Figure 4:
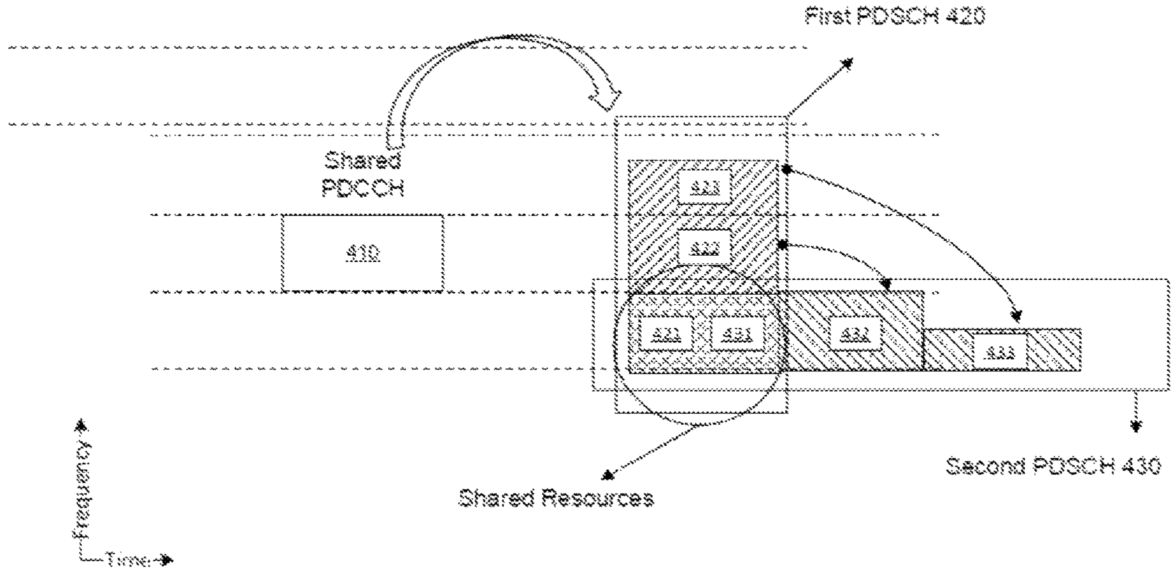
FIG. 4 is an example schematic of overlapping PDSCHs, according to various arrangements.
Figure 5:
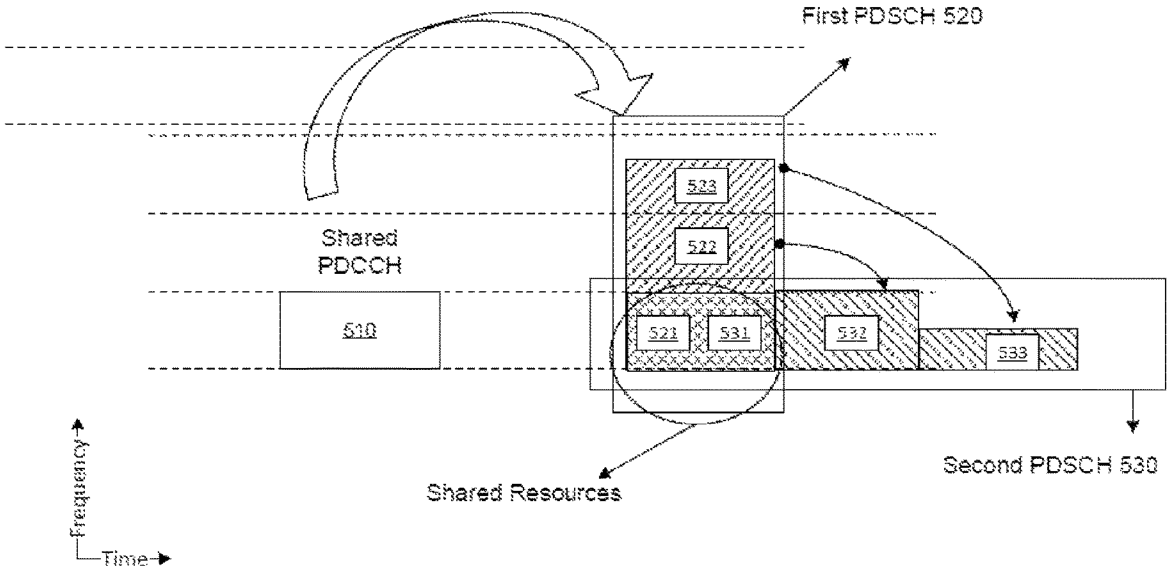
FIG. 5 is an example schematic of overlapping PDSCHs, according to various arrangements.

In some embodiments, the shared resources (e.g., the REs from different PDSCHs that overlap in the time and frequency domains) overlap in the frequency domain with at least part of the resources in the shared PDCCH transmission. Put differently, the shared resources include a bandwidth of the PDCCH, or the shared resources have a bandwidth that is the same as the bandwidth of the PDCCH. Examples of these embodiments are shown in FIGS. 4-5. Indications that the PDCCH is shared for scheduling the multiple PDSCHs, of which resources are the shared resources, and/or a position (e.g., in the frequency and/or time domains) of the shared resources, may be determined according to a predefined/default setting or via an indication in the received DCI (e.g., in reserved bits or repurposed fields), RRC signaling, or MAC CE signaling, each of which may be sent from the BS to the RedCap UE and/or the NR UE. In particular, any combination of time domain offset, number of symbols, symbol location within a slot, number of slots for the PDSCH(s), frequency offset, and number of RBs can be indicated in this way. If the PDSCH is indicated as being shared, a minimum bandwidth of the shared PDSCH is dependent on FR (e.g., 20 MHz for FR1, 100 MHz for FR2, etc.) and based on default settings, configured by high layer parameters (e.g., RRC signaling, MAC CE signaling), or indicated by DCI.

Similarly, the position (e.g., relative to the frequency domain and/or the time domain) of the shared resources can be any position of resources within the NR PDSCH (e.g., the PDSCH transmitted to the NR UE). In order to reduce DCI overhead, the position may be one of: a) at the bottom of the NR PDSCH frequency with X MHz or X RBs; b) at the top of NR PDSCH frequency with X MHz or X RBs; c) at the center of NR PDSCH frequency with X MHz or X RBs; or d) indicating one of Y bandwidth parts that are determined by dividing the NR PDSCH frequency (excluding the first or last of the Y bandwidth parts). These positions may be known to UE by default settings, configured by high layer parameters, or indicated by DCI.

In some embodiments, the BS indicates the shared resources by indicating which resources are allocated to each PDSCH. This resource allocation is indicated by one of two methods: first, similarly to existing methods, Time-Domain Resource Allocation (TDRA) and Frequency-Domain Resource Allocation (FDRA) are indicated in the DCI. For example, 3 bits of TDRA can be considered, or FDRA is considered based on the bounds of the PDSCH for the NR UE. Second, an offset in the time domain and/or the frequency domain are indicated. With regard to the time domain, the offset may be in a range defined as 0-x symbols, 0-y slots, and/or 0-z frames. Based on the starting/ending symbols/slots/frames of the PDSCH for the NR UE, an offset is determined for the PDSCH for the RedCap UE. The offset may be any combination of x symbols, y slots, and/or z frames. Similarly to the indications described above, the offset may be indicated by DCI, configured by high/higher layer parameters (e.g., RRC signaling, MAC CE), configured by the NR Node B (gNB), or can be based on default settings.

As described above, the number and location of the symbols/patterns may also be determined. The pattern can be indicated by DCI, configured by high layer parameter (e.g., RRC signaling, MAC CE), configured by the gNB, based on a default setting, or can be determined by the TDRA field for the PDSCH for the NR UE. For example, the symbol pattern is the same with the PDSCH for the NR UE scheduling indication, and the offset is indicated by 2 bits for 0, 1, 2, 3 slots based on the ending symbol of the PDSCH for the NR UE. In another example, the symbol pattern is indicated by the DCI with 1 bit, is the same as the NR UE, or is given as a full slot (e.g., all of the symbols are in a single slot). Here, the offset is 1 bit for a 0, 1 slot based on the ending of the PDSCH for the NR UE.

The offset in the frequency domain may be given in the range of 0-p subcarriers and/or 0-q Resource Blocks (RBs). In some embodiments, the offset for the RedCap PDSCH (e.g., the PDSCH transmitted to the RedCap UE) is based on the upper or lower bound of the frequency range of the NR PDSCH (e.g., the PDSCH transmitted to the NR UE), while in other embodiments, the offset for the RedCap PDSCH is based on the center of the frequency range of the NR PDSCH. When the number of RBs is indicated by the DCI, it can be assumed that the RedCap PDSCH and the NR PDSCH have the same center frequency, such that the RBs are similarly centered.

The DCI may also include a field with 0, 1, 2, or 3 bits used to indicate configurations for notifications regarding the Shared Channel (SC) MCCH changes. The DCI may include 2 fields for NR and RedCap MCCH change notification. For example, the DCI may include two different change notifications: a first notification that corresponds to the RedCap UE and a second notification that corresponds to the NR UE.

FIG. 4 is an example schematic 400 (e.g., time and frequency domain representation) of overlapping PDSCHs, according to various arrangements. In the schematic 400, the x-axis is the time domain, and the y-axis is the frequency domain. As shown in FIG. 4, a shared PDCCH 410 schedules a first PDSCH 420 and a second PDSCH 430. The first PDSCH 420 includes Resource Elements (REs) 421-423 and is transmitted to the NR UE, and the second PDSCH 430 includes REs 431-433 and is transmitted to the RedCap UE. The first PDSCH 420 and the second PDSCH 430 partially overlap in both the frequency domain and the time domain, as RE 421 and RE 431 share the same slot and bandwidth frequency and are shared resources. Furthermore, RE 421 corresponds with (e.g., is mapped to) RE 431, RE 422 corresponds with RE 432, and RE 423 corresponds with RE 433, such that REs 421 and 431, 422 and 432, and 423 and 433 carry the same data (e.g., within each pair). In addition, the shared PDCCH 410 is in the same frequency range as RE 422, which is part of the first PDSCH 420, such that the shared PDCCH 410 overlaps in the frequency domain with the first PDSCH 420.

FIG. 5 is an example schematic 500 of overlapping PDSCHs, according to various arrangements. In the schematic 500, the x-axis is the time domain, and the y-axis is the frequency domain. As shown in FIG. 5, a shared PDCCH 510 schedules a first PDSCH 520 and a second PDSCH 530. The first PDSCH 520 includes Resource Elements (REs) 521-523 and is transmitted to the NR UE, and the second PDSCH 530 includes REs 531-533 and is transmitted to the RedCap UE. The first PDSCH 520 and the second PDSCH 530 partially overlap in both the frequency domain and the time domain, as RE 521 and RE 531 share the same slot and bandwidth frequency and are shared resources. Furthermore, RE 521 corresponds with (e.g., is mapped to) RE 531, RE 522 corresponds with RE 532, and RE 523 corresponds with RE 533, such that REs 521 and 531, 522 and 532, and 523 and 533 carry the same data (e.g., between REs within each pair). In addition, the shared PDCCH 510 is in the same frequency range as REs 521 and 531 (e.g., the shared resources), such that the shared PDCCH 510 overlaps in the frequency domain with the shared resources. In each of FIGS. 4-5, the PDSCHs can be transmitted/located continuously in the time domain, such that the bandwidth of the first resource set (e.g., the first PDSCH 420, the first PDSCH 520) is not greater than the bandwidth of the shared resources.

The REs in each of the PDSCHs that do not overlap (e.g., are not part of the shared resources) are referred to as 'remaining resources.' The resources that make up the remaining resources for a particular PDSCH can be determined based on the shared resources and/or (the REs, resources, resource set, bandwidth. etc. of) the particular/other PDSCH. For example, the remaining resources in the first PDSCH (e.g., the first PDSCH 420) are divided into Y portions by the bandwidth of the shared part. Therefore, the first Y−1 portions have the same bandwidth and last portion may have the same or different bandwidth. For example, if the bandwidth of the particular/other PDSCH is L and the bandwidth of shared portion is X, there are Y portions (including the shared part) for the first resource set. Y can be determined by $$Y = \left\lceil \frac{L}{X} \right\rceil.$$

In another example, the resources that make up the remaining resources can be determined by subtracting (or removing) the RE(s) (e.g., RE 421) in the shared resources from the total REs in the first PDSCH (e.g., REs 421-423), such that the remaining resources are given as the other REs (e.g., REs 422-423).

In some embodiments, each of the PDSCHs has the same Transport Block Size (TBS) or the same number of REs. Put differently, each of the NR PDSCH and the RedCap PDSCH have the same TBS when the NR PDSCH and the RedCap PDSCH have shared resources. Using FIG. 4 as an example, each of the PDSCHs having the same number of REs means that REs 421-423 of the first PDSCH 420 are the same size as REs 431-433 of the second PDSCH 430.

In those embodiments in which there is continuous mapping in the time domain (e.g., transmitting without gaps), if the remaining resources in the RedCap PDSCH are the same quantity (e.g., in MHz or RBs) with that of the NR PDSCH, the mapping (or transmission details) of those remaining resources can be determined according to one of the following methods. For Downlink (DL) resource allocation type 1, the DL type 1 resource allocation field consists of a Resource Indication Value (RIV) corresponding to a starting virtual resource block (given as $RB_{start}$) and a length corresponding to contiguously allocated resource blocks (given as $L_{RBs}$). For RedCap PDSCH scheduling, the pattern in a slot is the same across multiple slots, and the PDSCH resources can be mapped according to the following: If $L_{RBs}$ mod X>0, then for slot $$n - n + \left\lceil \frac{L_{RBs}}{X} \right\rceil - 1,$$

X RBs are occupied and for slot $$n + \left\lceil \frac{L_{RBs}}{X} \right\rceil, L_{RBs} - X\left(\left\lceil \frac{L_{RBs}}{X} \right\rceil - 1\right)$$

RBs are occupied. Otherwise, for slot $$n \sim n + \frac{L_{RBs}}{X},$$

X RBs are occupied. Alternatively, if $L_{RBs}$>=X for slot $$n \sim n + \left\lceil \frac{L_{RBs}}{X} \right\rceil - 1,$$

X RBs are occupied, and for slot $$n + \left\lceil \frac{L_{RBs}}{X} \right\rceil, L_{RBs} - X\left(\left\lceil \frac{L_{RBs}}{X} \right\rceil - 1\right)$$

RBs are occupied. Otherwise, for slot n, X RBs are occupied.

If there is repetition (e.g., if the PDSCH transmissions are repeated sequentially), If $$L_{RBs} \bmod X > 0, \text{ set } i = 0, 1, \ldots, \left\lceil \frac{L_{RBs}}{X} \right\rceil - 2,$$

the number of repetitions is set as N, and the PDSCH is scheduled in slot number n+$m_j$, where j is within a range defined by 1–N, and n+$m_j$ refers to the slot number corresponding to the $j^{th}$ repetition. The assumed gap between repetitions is h slots.

For slot n+$m_j$, (e.g., the starting slot number for PDSCH), X RBs are occupied, and for slot n+$m_j$+i*(h+N), X RBs are occupied. For slot $$n + m_j + \left(\left\lceil \frac{L_{RBs}}{X} \right\rceil - 1\right) * (h + N), L_{RBs} - X\left(\left\lceil \frac{L_{RBs}}{X} \right\rceil - 1\right)$$

RBs are occupied. Otherwise, $$i = 0, 1, \ldots, \left\lceil \frac{L_{RBs}}{X} \right\rceil - 1.$$

For slot n+$m_j$+i(h+N), X RBs are occupied, or if $L_{RBs}$>=X, the value for i is set as $$0, 1, \ldots, \left\lceil \frac{L_{RBs}}{X} \right\rceil - 2.$$

For slot n+$m_j$, (e.g., the starting slot number for PDSCH), X RBs are occupied, and for slot n+$m_j$+i*(h+N), X RBs are occupied. For slot $$n + m_j + \left(\left\lceil \frac{L_{RBs}}{X} \right\rceil - 1\right) * (h + 1), L_{RBs} - X\left(\left\lceil \frac{L_{RBs}}{X} \right\rceil - 1\right)$$

RBs are occupied. Otherwise, for slot n+$m_j$, X RBs are occupied.

Figure 6:
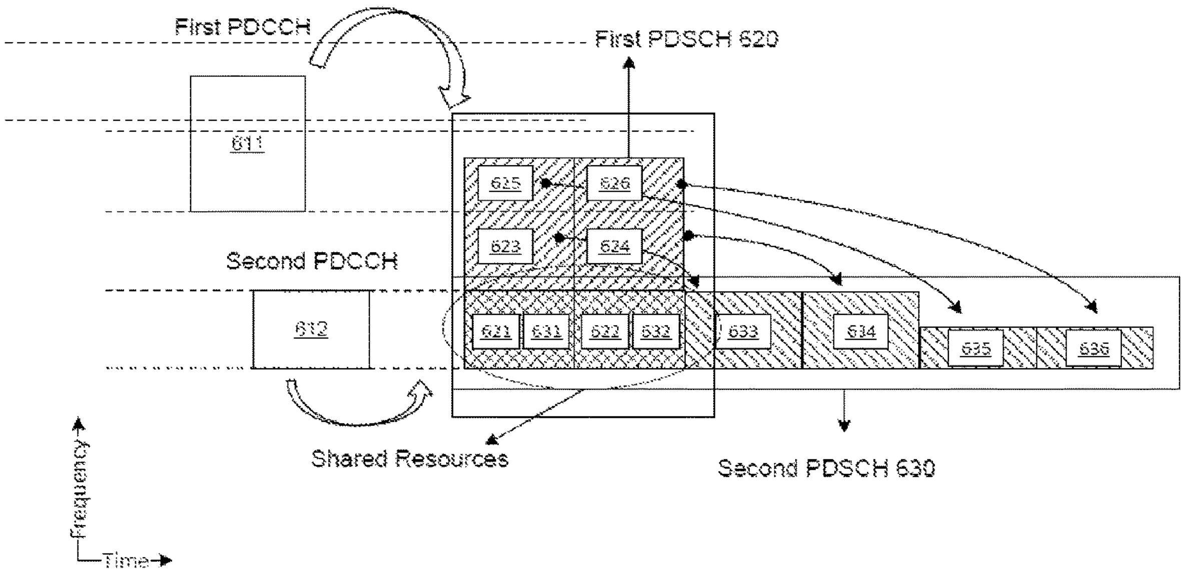
FIG. 6 is an example schematic of overlapping PDSCHs with separate PDCCHs, according to various arrangements.

FIG. 6 is an example schematic 600 of overlapping PDSCHs with separate PDCCHs, according to various arrangements. In the schematic 600, the x-axis is the time domain, and the y-axis is the frequency domain. As shown in FIG. 6, a first PDCCH 611 schedules a first PDSCH 620, and a second PDCCH 612 schedules a second PDSCH 630. The first PDSCH 620 is transmitted with repetition and includes REs 621-626, and the second PDSCH 630 is similarly transmitted with repetition and includes REs 631-636. The first PDSCH 620 and the second PDSCH 630 partially overlap in both the frequency domain and the time domain, as REs 621-622 and REs 631-632 share the same slot and bandwidth frequency and are shared resources. Furthermore, RE 621 corresponds with (e.g., is mapped to) RE 631, RE 622 corresponds with RE 632, RE 623 corresponds with RE 633, RE 624 corresponds with RE 634, RE 625 corresponds with RE 635, and RE 626 corresponds with RE 636, such that REs 621 and 631, 622 and 632, 623 and 633, 624 and 634, 625 and 635, and 626 and 636 carry the same data (e.g., between REs within each pair). In addition, part of the first PDCCH 611 is in the same frequency range as REs 625 and 626, such that the first PDCCH 611 overlaps in the frequency domain with the first PDSCH 620, and the second PDCCH 612 in the same frequency range as REs 621-622 and 631-632 (e.g., the shared resources), such that the second PDCCH 612 overlaps in the frequency domain with the shared resources. In this embodiment, the second PDSCH 630 (e.g., the RedCap PDSCH) are mapped into a same bandwidth in the frequency domain due to the reduced bandwidth capabilities of a RedCap UE.

In those embodiments in which there is continuous mapping in the time domain (e.g., transmitting without gaps), if the remaining resources in the RedCap PDSCH are of a different quantity (e.g., in MHz or RBs) with that of the NR PDSCH, the mapping of those remaining resources can be determined according to one of the following methods. For DL resource allocation type 0, if X is larger than Resource Block Group (RBG) size P and the number of RBG is indicated as N, the slots number for the RedCap PDSCH (e.g., the PDSCH transmitted to the RedCap UE is $$\left\lceil \frac{N}{Z} \right\rceil$$

slots in total, where $$Z = \left\lfloor \frac{X}{P} \right\rfloor$$

refers to the number of RBG in X RBs if X is greater than or equal to P. Here, the RBG is a set of consecutive virtual resource blocks defined by higher layer parameter rbg-Size and/or configured by PDSCH-config).

For the $i^{th}$ slot where $$i \in \left(1, \left\lceil \frac{N}{Z} \right\rceil - 1\right),$$

and the PDSCH in each slot has the same frequency range. For the $$\left\lceil \frac{N}{Z} \right\rceil_{-th}$$

slot, the left $$N-\left(\left\lceil\frac{N}{Z}\right\rceil-1\right)*Z$$

RBGs are mapped into the last slot. For $j^{th}$ RBG numbered in increasing order from the lowest frequency, the PDSCH is mapped into the $m^{th}$ RBG in slot i, which is defined according to the following relationship: m=j mod Z+1; j=i*Z+m, $$i\in\left(1,\left\lceil\frac{N}{Z}\right\rceil\right).$$

If the PDSCH in each slot are in the same frequency range, the frequency range is no larger than the RedCap UE bandwidth (which is limited because of RedCap).

Figure 7:
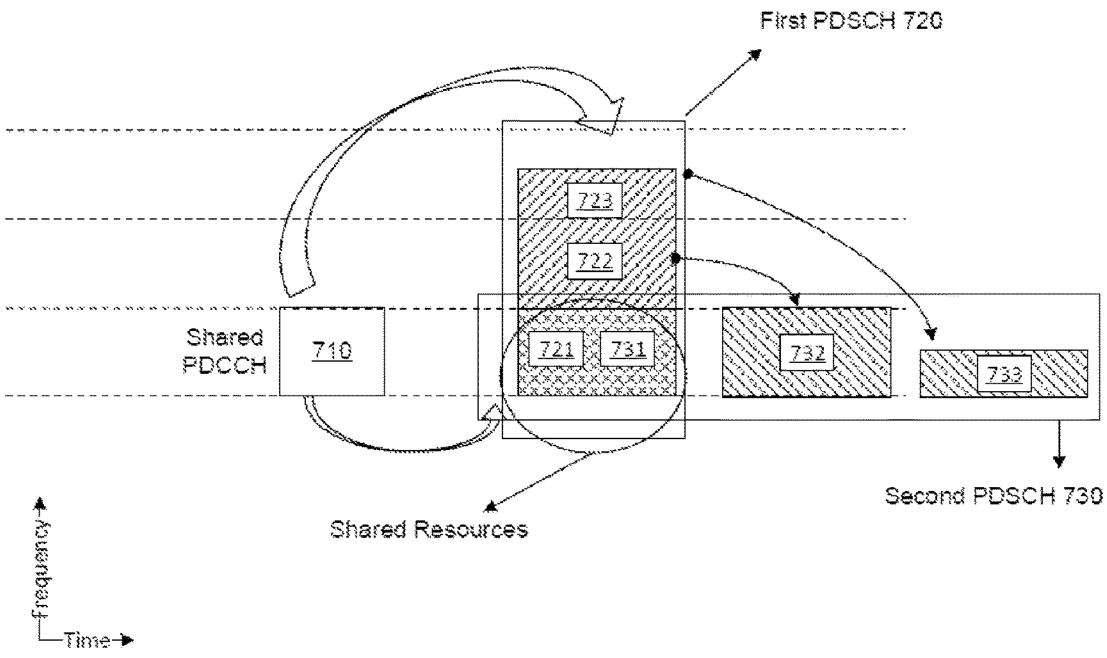
FIG. 7 is an example schematic of overlapping PDSCHs with discontinuous Reduced Capability (RedCap) PDSCH transmission, according to various arrangements.

In some embodiments, the RedCap PDSCH is transmitted discontinuously, such that there are gaps between transmission slots of equal length. The length of the gaps, given as h slots, may be determined according to pre-defined rules. FIG. 7 is an example schematic 700 of overlapping PDSCHs with discontinuous RedCap PDSCH transmission, according to various arrangements. In the schematic 700, the x-axis is the time domain, and the y-axis is the frequency domain. As shown in FIG. 7, a shared PDCCH 710 schedules a first PDSCH 720 and a second PDSCH 730. The first PDSCH 720 includes Resource Elements (REs) 721-723 and is transmitted to the NR UE, and the second PDSCH 730 includes REs 731-733 and is transmitted to the RedCap UE. The first PDSCH 720 and the second PDSCH 730 partially overlap in both the frequency domain and the time domain, as RE 721 and RE 731 share the same slot and bandwidth frequency and are shared resources. Furthermore, RE 721 corresponds with (e.g., is mapped to) RE 731, RE 722 corresponds with RE 732, and RE 723 corresponds with RE 733, such that REs 721 and 731, 722 and 732, and 723 and 733 carry the same data (and/or same symbol positions/pattern, e.g., between REs within each pair). In addition, the shared PDCCH 710 is in the same frequency range as REs 721 and 731 (e.g., the shared resources), such that the shared PDCCH 710 overlaps in the frequency domain with the shared resources.

In some embodiments for RedCap PDSCH scheduling in discontinuous transmission, the symbol mapping pattern in a slot is the same across multiple slots (e.g., in the time domain), and the frequency mapping pattern in the same across multiple slots, with the possible exception of the last slot. Using the schematic 700 as an example, each of REs 731-733 have the same dimension in the x-axis (e.g., the time domain), while REs 731-732 have the same dimension in the y-axis and RE 733 (e.g., the RE in the last slot) is slightly smaller.

Figure 8:
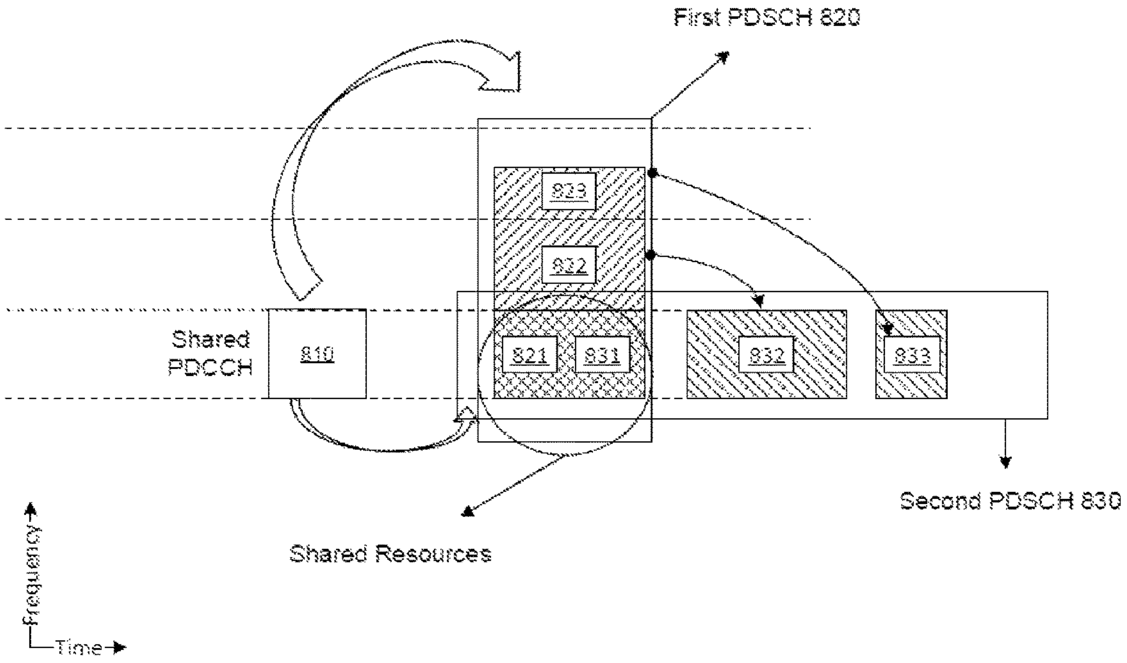
FIG. 8 is an example schematic of overlapping PDSCHs with discontinuous RedCap PDSCH transmission, according to various arrangements.
Figure 9:
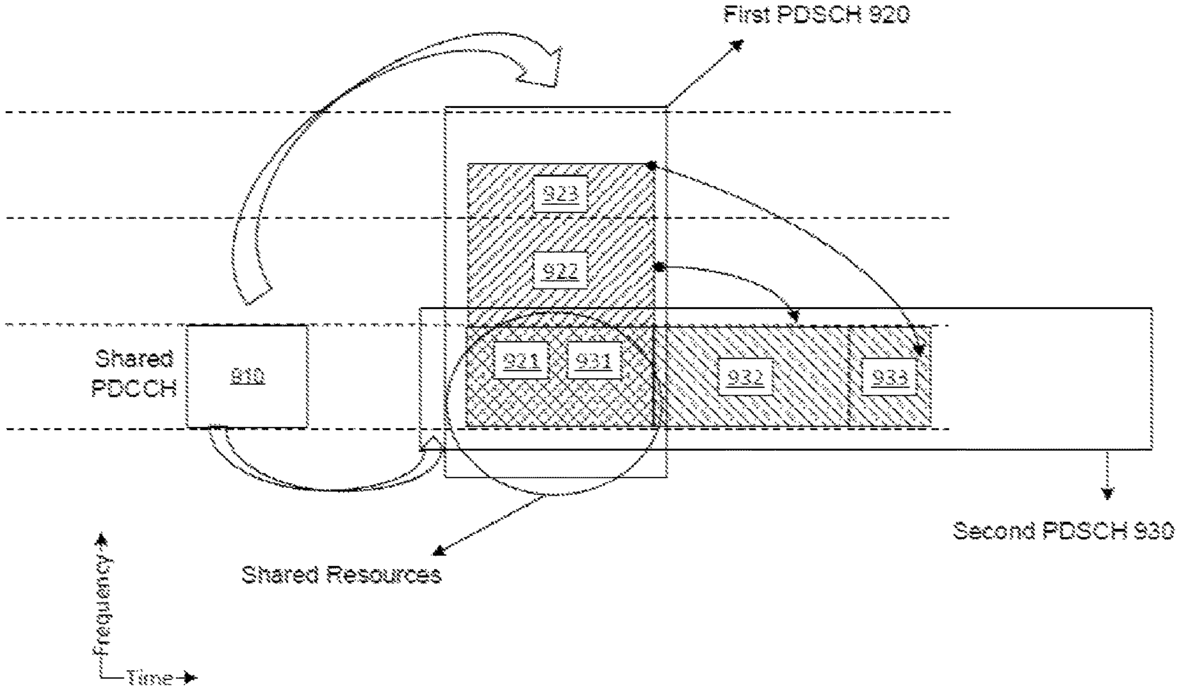
FIG. 9 is an example schematic of overlapping PDSCHs with continuous RedCap PDSCH transmission, according to various arrangements.

In other embodiments for either continuous or discontinuous PDSCH transmission, the RedCap PDSCH (e.g., the PDSCH transmitted to the RedCap UE) may be transmitted across multiple slots with the same frequency bandwidth but different slot sizes. Examples of these embodiments are shown in FIGS. 8-9. FIG. 8 is an example schematic 800 of overlapping PDSCHs with discontinuous RedCap PDSCH transmission, according to various arrangements. In the schematic 800, the x-axis is the time domain, and the y-axis is the frequency domain. As shown in FIG. 8, a shared PDCCH 810 schedules a first PDSCH 820 and a second PDSCH 830. The first PDSCH 820 includes Resource Elements (REs) 821-823 and is transmitted to the NR UE, and the second PDSCH 830 includes REs 831-833 and is transmitted to the RedCap UE. REs 831-833 are all the same height in the schematic 800, indicating that all of the REs of the second PDSCH have the same frequency bandwidth. The first PDSCH 820 and the second PDSCH 830 partially overlap in both the frequency domain and the time domain, as RE 821 and RE 831 share the same slot and bandwidth frequency and are shared resources. Furthermore, RE 821 corresponds with (e.g., is mapped to) RE 831, RE 822 corresponds with RE 832, and RE 823 corresponds with RE 833, such that REs 821 and 831, 822 and 832, and 823 and 833 carry the same data. In addition, the shared PDCCH 810 is in the same frequency range as REs 821 and 831 (e.g., the shared resources), such that the shared PDCCH 810 overlaps in the frequency domain with the shared resources.

FIG. 9 is an example schematic 900 of overlapping PDSCHs with continuous RedCap PDSCH transmission, according to various arrangements. In the schematic 900, the x-axis is the time domain, and the y-axis is the frequency domain. As shown in FIG. 9, a shared PDCCH 910 schedules a first PDSCH 920 and a second PDSCH 930. The first PDSCH 920 includes Resource Elements (REs) 921-923 and is transmitted to the NR UE, and the second PDSCH 930 includes REs 931-933 and is transmitted to the RedCap UE. The first PDSCH 920 and the second PDSCH 930 partially overlap in both the frequency domain and the time domain, as RE 921 and RE 931 share the same slot and bandwidth frequency and are shared resources. Furthermore, RE 921 corresponds with (e.g., is mapped to) RE 931, RE 922 corresponds with RE 932, and RE 923 corresponds with RE 933, such that REs 921 and 931, 922 and 932, and 923 and 933 can carry the same data. In addition, the shared PDCCH 910 is in the same frequency range as REs 921 and 931 (e.g., the shared resources), such that the shared PDCCH 910 overlaps in the frequency domain with the shared resources.

As shown in FIGS. 8-9, REs 831-833 and 931-933 have the same frequency bandwidth (e.g., are the same height in the y-direction) but have different slot sizes (e.g., are different lengths in the x-direction).

Figure 10:
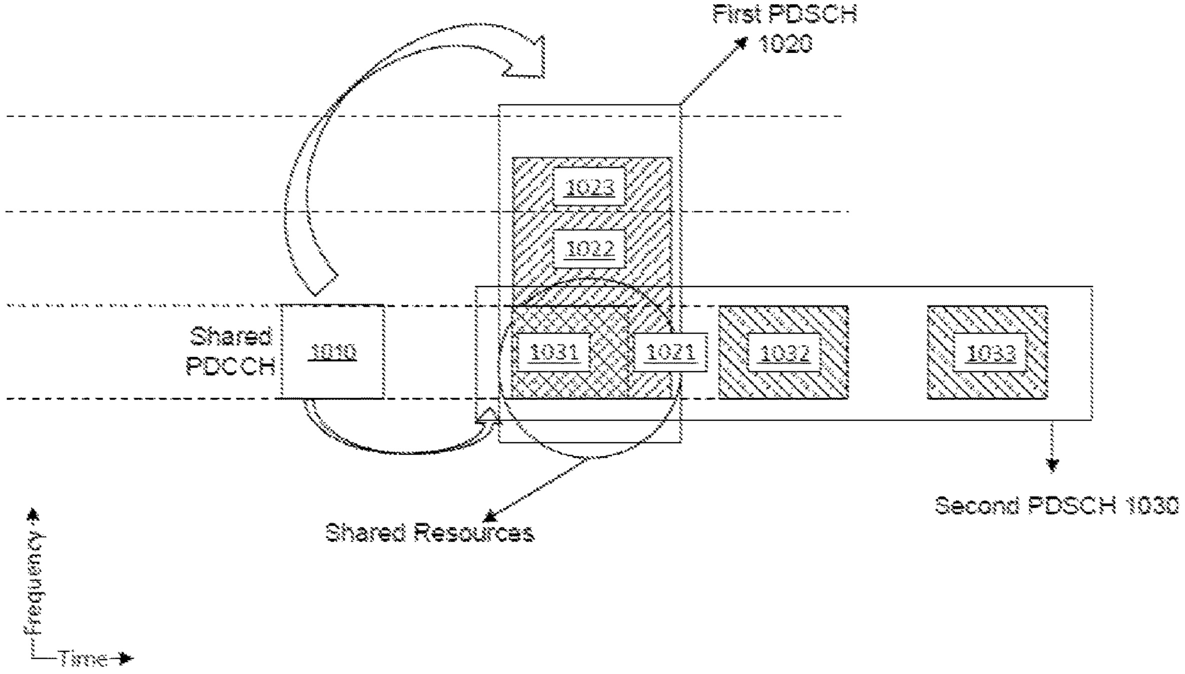
FIG. 10 is an example schematic of overlapping PDSCHs with continuous RedCap PDSCH transmission, according to various arrangements.

In further embodiments for either continuous or discontinuous PDSCH transmission, the RedCap PDSCH (e.g., the PDSCH transmitted to the RedCap UE) may be transmitted across multiple spots with the same frequency bandwidth and the same slot sizes. An example of these embodiments is shown in FIG. 10. FIG. 10 is an example schematic 1000 of overlapping PDSCHs with continuous RedCap PDSCH transmission, according to various arrangements. In the schematic 1000, the x-axis is the time domain, and the y-axis is the frequency domain. As shown in FIG. 10, a shared PDCCH 1010 schedules a first PDSCH 1020 and a second PDSCH 1030. The first PDSCH 1020 includes Resource Elements (REs) 1021-1023 and is transmitted to the NR UE, and the second PDSCH 1030 includes REs 1031-1033 and is transmitted to the RedCap UE. The first PDSCH 1020 and the second PDSCH 1030 partially overlap in both the frequency domain and the time domain, as RE 1021 and RE 1031 share the same slot and bandwidth frequency and are shared resources. However, in order for each of the REs of the RedCap PDSCH (e.g., the second PDSCH 1030) to have the same slot size and frequency bandwidth, each of the REs in the first PDSCH 1020 do not directly map to the REs in the second PDSCH 1030, in contrast to the previous example embodiments. Instead, the data carried by the combination of REs 1021-1023 is the same as the data carried by the combination of REs 1031-1033.

Mapping rules determine how the UE (either NR UE or RedCap UE) detects the PDSCH after the PDSCH is received. Furthermore, the mapping rules also define how the gNB maps resources into a third resource set, such as a Virtual Resource Block (VRB). The mapping rules may also apply to mapping (or transmission) procedures for other channels (e.g., PDSCH, Physical Uplink Scheduling Channel (PUSCH), etc.) The VRB includes a certain number of portions, and is defined according to a portion index, a subcarrier index, and/or a symbol index. The mapping rule utilized by current systems (e.g., the legacy mapping rule) states that mapping to REs $(k', l)_{p,\mu}$ that have been allocated for PDSCH (and not reserved for other purposes) is performed in increasing order of the index k' over the assigned VRBs and then the index l, where k'=0 is the first subcarrier in the lowest-numbered VRB assigned for transmission. As shown in the below table 1, in the first symbol (e.g., the first column), the mapping (or transmission) starts at the lowest subcarrier (e.g., frequency) and increases the subcarrier index incrementally. Once the last subcarrier in the first symbol (e.g., time) is mapped, the mapping proceeds to the next symbol (e.g., the second column) and continues mapping in increasing order. Once all the subcarriers in that portion have been mapped, the mapping proceeds to the next portion (e.g., increases the portion index). As shown in table 1, the subcarrier index increases in the y-direction and the symbol index increases in the x-direction. The entire table 1 is a single portion, so the increase in portion index is not shown.

TABLE 1

| | |
|---|---|
| 5 | 11 |
| 4 | 10 |
| 3 | 9 |
| 2 | 8 |
| 1 | 7 |
| 0 | 6 |

In other embodiments, the mapping similarly starts at the lowest subcarrier and increases incrementally, but proceeds to the next portion of the VRB rather than to the next symbol as in legacy mapping methods. Once the final subcarrier in the portion has been mapped, the mapping then proceeds to the next symbol. An example of this embodiment is shown in the below table 2. As shown in table 2, the subcarrier index increases in the y-direction and the symbol index increases in the x-direction. Bolded text indicates the portion grouping within an index (e.g., bolded or unbolded text in adjacent boxes indicates the bounds of a portion).

TABLE 2

| | | | | | |
|---|---|---|---|---|---|
| **1** | **7** | 3 | 9 | **5** | **11** |
| **0** | **6** | 2 | 8 | **4** | **10** |

Figure 11A:
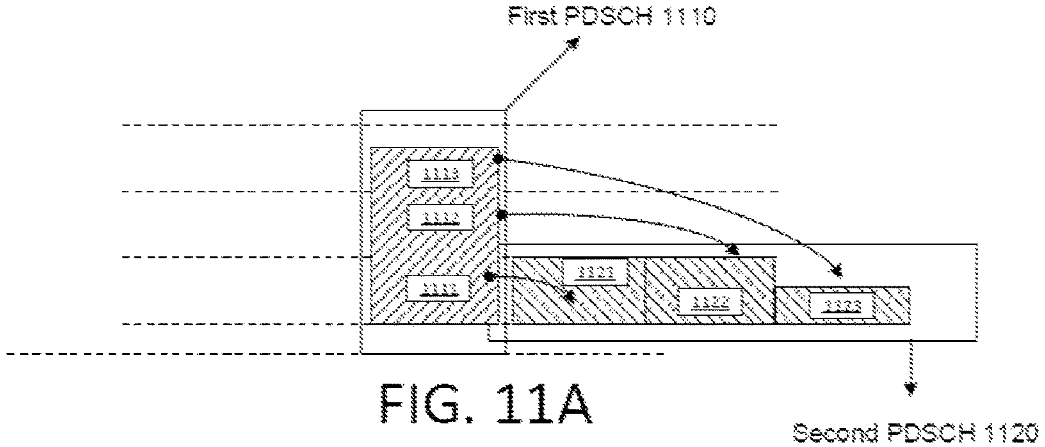
FIG. 11A is an example schematic of non-overlapping PDSCHs, according to various arrangements.
Figure 11B:
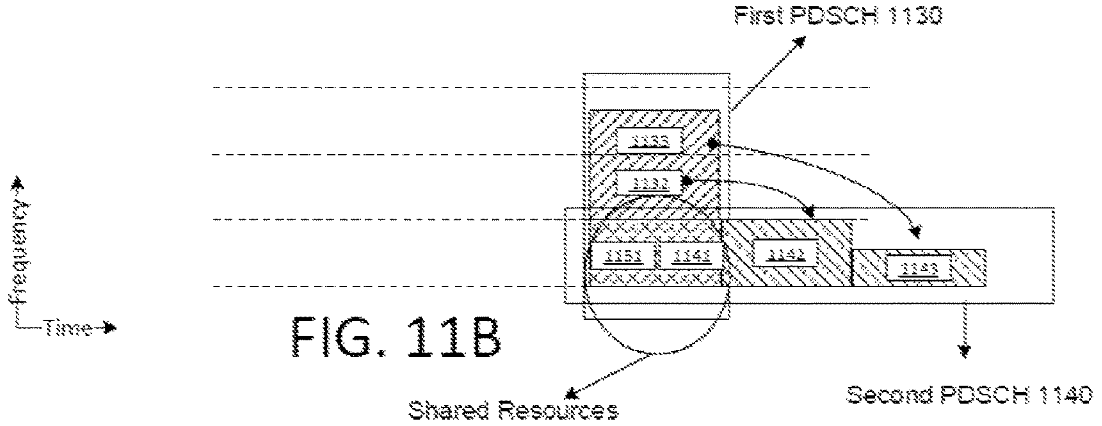
FIG. 11B is an example schematic of overlapping PDSCHs, according to various arrangements.

Put differently, the RedCap PDSCH can be derived by dividing the legacy NR PDSCH of table 1 into m bands, numbered from 0 to m−1. Each of the m bands are under a certain bandwidth (e.g., 20 MHz), and then arranged sequentially in the time domain, such that the legacy mapping rule is reused for each portion. FIGS. 11A-B provide visual representations of this derivation for both overlapping and non-overlapping PDSCHs.

FIG. 11A is an example schematic 1100A of non-overlapping PDSCHs, according to various arrangements. In the schematic 1100A, the x-axis is the time domain, and the y-axis is the frequency domain. As shown in FIG. 11A, a first PDSCH 1110 and a second PDSCH 1120 are scheduled. The first PDSCH 1110 includes Resource Elements (REs) 1111-1113 and is transmitted to the NR UE, and the second PDSCH 1120 includes REs 1121-1123 and is transmitted to the RedCap UE. The first PDSCH 1110 and the second PDSCH 1120 do not overlap in the time domain but do overlap in the frequency domain. However, because the first PDSCH 1110 and the second PDSCH do not overlap in both domains, there are no shared resources. Despite this lack of time overlap, REs 1111 and 1121, REs 1112 and 1122, and REs 1113 and 1123 are mapped to each other, such that REs 1111 and 1121, REs 1112 and 1122, and REs 1113 and 1123 have the same data.

FIG. 11B is an example schematic 1100B of overlapping PDSCHs, according to various arrangements. In the schematic 1100B, the x-axis is the time domain, and the y-axis is the frequency domain. As shown in FIG. 11B, a first PDSCH 1130 and a second PDSCH 1140 are scheduled. The first PDSCH 1130 includes Resource Elements (REs) 1131-1133 and is transmitted to the NR UE, and the second PDSCH 1140 includes REs 1141-1143 and is transmitted to the RedCap UE. The first PDSCH 1130 and the second PDSCH 1140 overlap in both the time domain and the frequency domain, as RE 1131 and RE 1141 completely overlap. As such, RE 1131 and RE 1141 form the shared resources here. Furthermore, REs 1132 and 1142, and REs 1133 and 1143 are mapped to each other, such that REs 1132 and 1142, and REs 1133 and 1143 have the same data.

Alternatively, a legacy NR PDSCH that is determined according to table 2 can be used to derive a RedCap PDSCH by dividing the legacy PDSCH into m blocks along the time domain and numbering those blocks from 0 to m−1. From there, the divided blocks are stacked sequentially in the frequency domain, which allows the mapping rule to be re-used for each block. A visual representation of this derivation is found in FIG. 12.

FIG. 12 is an example schematic 1200 of non-overlapping PDSCHs, according to various arrangements. In the schematic 1200, the x-axis is the time domain, and the y-axis is the frequency domain. As shown in FIG. 12, a first PDSCH 1210 and a second PDSCH 1220 are scheduled (or triggered, prompted, configured, etc.). The first PDSCH 1210 includes Resource Elements (REs) 1211-1213 and is transmitted to the NR UE, and the second PDSCH 1220 includes REs 1221-1223 and is transmitted to the RedCap UE. The first PDSCH 1210 and the second PDSCH 1220 overlap in both the time domain and the frequency domain, as RE 1211 and RE 1221 completely overlap. As such, RE 1211 and RE 1221 form the shared resources here. Furthermore, REs 1211 and 1221, REs 1212 and 1222, and REs 1213 and 1223 are mapped to each other, such that REs 1211 and 1221, REs 1212 and 1222, and REs 1213 and 1223 have the same data.

As described above, the VRB includes a certain number of portions, given as M. In some embodiments, the M portions are continuous, while in other embodiments, there are gaps between each consecutive portion (such that the M portions are discontinuous). In some embodiments, the M portions of the VRB (e.g., the third resource set) correspond in the frequency domain to the same number of M portions of a fourth resource set. Here, each of the corresponding pair of portions have the same bandwidth and the same number of symbols. M may be determined by a bandwidth of the fourth resource set, given as L, and by a bandwidth of shared resources between the third resource set and the fourth resource set, given as X. This relationship is defined as $Y=\lceil L/X \rceil$.

As discussed herein, PDSCH mapping from a NR PDSCH to a RedCap PDSCH can be accomplished even with PDSCH repetition (e.g., transmitting identical resource sets back-to-back in order to provide redundant transmissions and/or to ensure/support a complete transmission). Furthermore, the PDSCH mapping can be performed if the NR PDSCH is continuously transmitted (e.g., the portions of the NR PDSCH are in consecutive slots) or is discontinuously transmitted (e.g., there are gaps between portions of the NR PDSCH). In some embodiments, the repetition is performed in a single slot (e.g., multiple identical resource sets in a single slot), while in other embodiments, the repetition is performed in different slots. If multiple slots are utilized, the NR PDSCH resources are mapped into different slots or portions based on bandwidth, as the RedCap UE may not be able to transmit resources above a certain bandwidth value. The number of portions, given as Y, is determined based on a bandwidth of the second resource set (e.g., the RedCap PDSCH), given as L, and a bandwidth of the shared resources between the NR PDSCH and the RedCap PDSCH, given as X. These shared resources may be transmitted across multiple slots.

FIG. 13 is an example schematic 1300 of overlapping PDSCHs in a repetition scheme, according to various arrangements. In the schematic 1300, the x-axis is the time domain, and the y-axis is the frequency domain. As shown in FIG. 13, a shared PDCCH 1310 schedules a first PDSCH 1320 and a second PDSCH 1330. The first PDSCH 1320 is transmitted with repetition and includes REs 1321-1326, and the second PDSCH 1330 is similarly transmitted with repetition and includes REs 1331-1336. The first PDSCH 1320 and the second PDSCH 1330 partially overlap in both the frequency domain and the time domain, as REs 1321-1322 and REs 1331-1332 share the same slot and bandwidth frequency and are shared resources. As such, the shared resources are transmitted across multiple slots. Furthermore, RE 1321 corresponds with (e.g., is mapped to) RE 1331, RE 1322 corresponds with RE 1332, RE 1323 corresponds with RE 1333, RE 1324 corresponds with RE 1334, RE 1325 corresponds with RE 1335, and RE 1326 corresponds with RE 1336, such that REs 1321 and 1331, 1322 and 1332, 1323 and 1333, 1324 and 1334, 1325 and 1335, and 1326 and 1336 carry the same data. In addition, the shared PDCCH 1310 is in the same frequency range as REs 1321-1322 and 1331-1332 (e.g., the shared resources), such that the shared PDCCH 1310 overlaps in the frequency domain with the shared resources. In some embodiments, such as the one shown in FIG. 13, the last portion of the RedCap PDSCH may have a different bandwidth, time length, different size or pattern (e.g., the symbol allocation in a slot).

Figure 14:
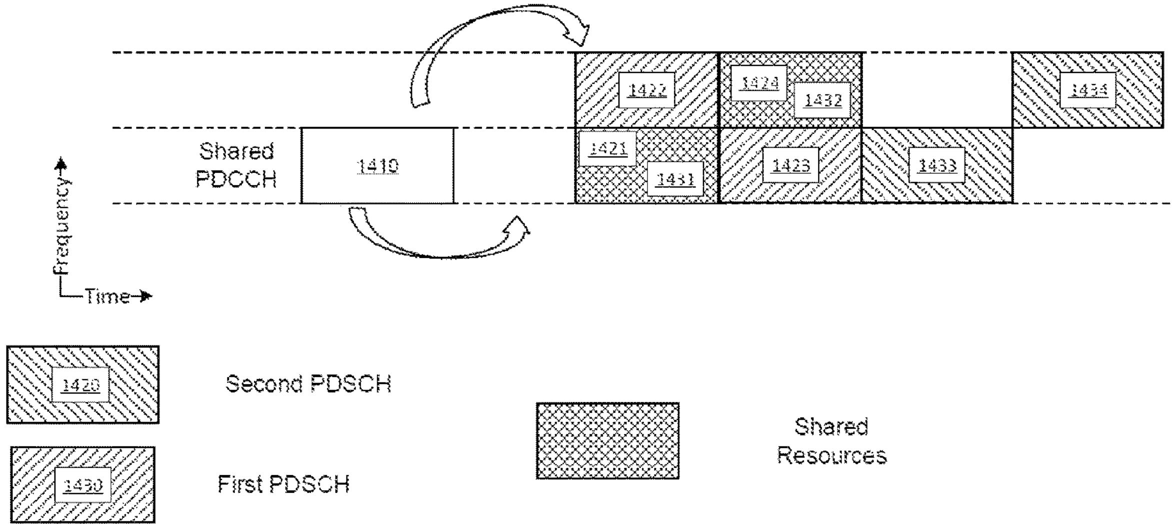
FIG. 14 is an example schematic of overlapping PDSCHs in a repetition scheme with continuous transmission, according to various arrangements.

FIG. 14 is an example schematic 1400 of overlapping PDSCHs in a repetition scheme with continuous transmission, according to various arrangements. In the schematic 1400, the x-axis is the time domain, and the y-axis is the frequency domain. As shown in FIG. 14, a shared PDCCH 1410 schedules a first PDSCH 1420 and a second PDSCH 1430. The first PDSCH 1420 is transmitted with repetition and includes REs 1421-1424, and the second PDSCH 1430 is similarly transmitted with repetition and includes REs 1431-1434. The first PDSCH 1420 and the second PDSCH 1430 partially overlap in both the frequency domain and the time domain, as REs 1421 and 1431 and REs 1424 and 1432 share the same slot and bandwidth frequency and are shared resources. Furthermore, RE 1421 corresponds with (e.g., is mapped to) RE 1431, RE 1422 corresponds with RE 1432, RE 1423 corresponds with RE 1433, and RE 1424 corresponds with RE 1434, such that REs 1421 and 1431, 1422 and 1432, 1423 and 1433, and 1424 and 1434, carry the same data. As such, the shared resources do not carry the same data, as the shared resources include REs 1424 and 1432.

Figure 15:
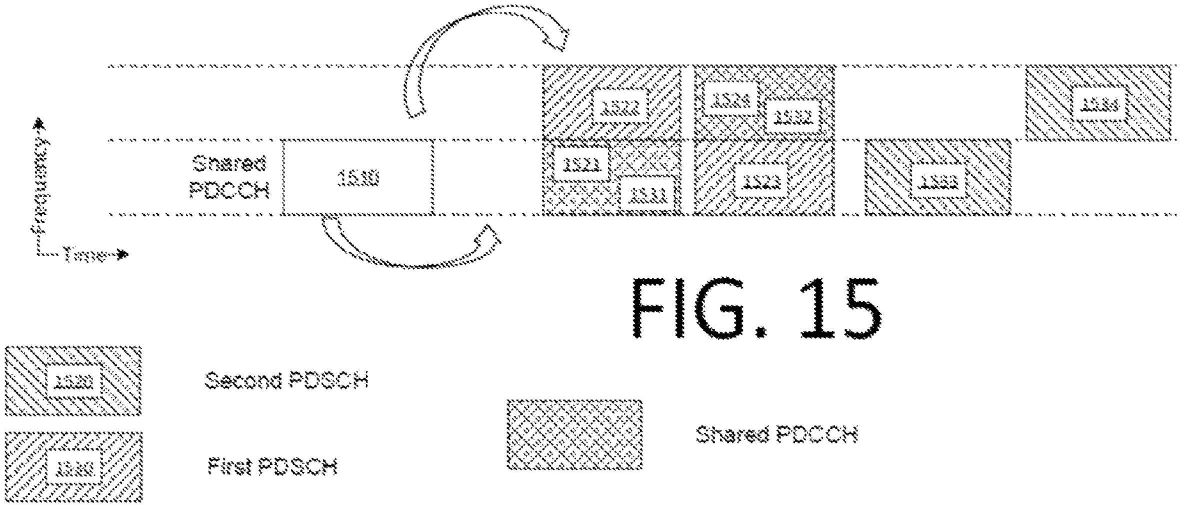
FIG. 15 is an example schematic of overlapping PDSCHs in a repetition scheme with discontinuous transmission, according to various arrangements.

FIG. 15 is an example schematic 1500 of overlapping PDSCHs in a repetition scheme with discontinuous transmission, according to various arrangements. In the schematic 1500, the x-axis is the time domain, and the y-axis is the frequency domain. As shown in FIG. 15, a shared PDCCH 1510 schedules a first PDSCH 1520 and a second PDSCH 1530. The first PDSCH 1520 is transmitted with repetition and includes REs 1521-1524, and the second PDSCH 1530 is similarly transmitted with repetition and includes REs 1531-1534. Both the first PDSCH 1520 and the second PDSCH 1530 include gaps between consecutive REs. The first PDSCH 1520 and the second PDSCH 1530 partially overlap in both the frequency domain and the time domain, as REs 1521 and 1531 and REs 1524 and 1532 share the same slot and bandwidth frequency and are shared resources. Furthermore, RE 1521 corresponds with (e.g., is mapped to) RE 1531, RE 1522 corresponds with RE 1532, RE 1523 corresponds with RE 1533, and RE 1524 corresponds with RE 1534, such that REs 1521 and 1531, 1522 and 1532, 1523 and 1533, and 1524 and 1534, carry the same data. As such, the shared resources do not carry the same data, as the shared resources include REs 1524 and 1532.

Figure 16A:
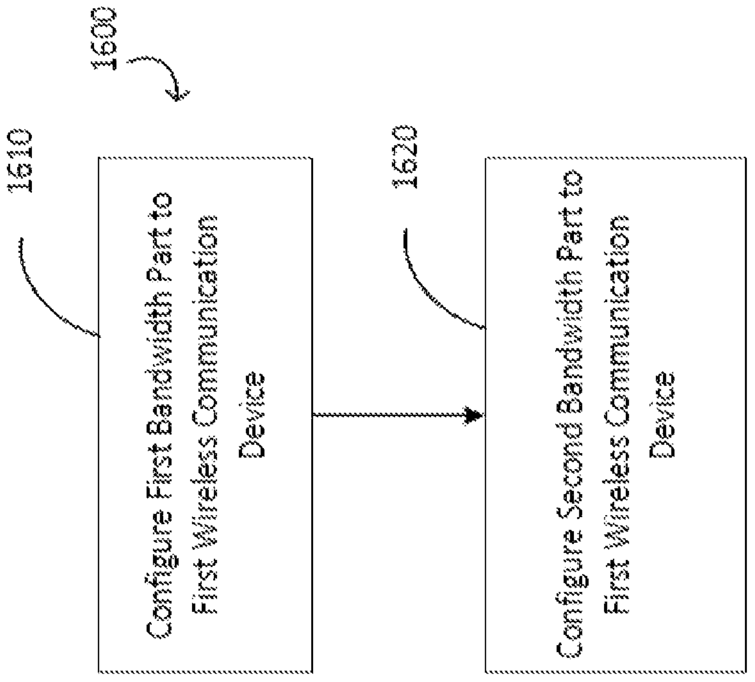
FIG. 16A is a flowchart diagram illustrating an example wireless communication method for multicast transmission on a reduced capability user equipment, according to various embodiments.

FIG. 16A is a flowchart diagram illustrating an example wireless communication method 1600, according to various arrangements. Method 1600 can be performed by a Base Station (BS), and begins at 1610 where the BS configures a first Bandwidth Part (BWP) for a first User Equipment (UE). The first BWP is used to transmit a Multicast Control Channel (MCCH). At 1620, the BS configures a second BWP for the first UE. The second BWP is used to transmit a Multicast Traffic Channel (MTCH).

In some embodiments, the first BWP is shared between the first UE and a second UE for transmission of a MCCH by the second UE. In some of these embodiments, the method 1600 further includes configuring a third BWP to the second UE that is used to transmit a MTCH for the second UE. In other of these embodiments, the first BWP is shared between the first UE and second UE for transmission of a MTCH for the second UE. In further of these embodiments, the second BWP is shared between the first UE and second UE for transmission of a MTCH for the second UE. In still further of these embodiments, the method 1600 further includes transmitting a first Physical Downlink Shared Channel (PDSCH) transmission on a first resource set to the first UE and a second PDSCH transmission on a second resource set to the second UE. The first resource set at least partially shares resources with the second resource set in the time and frequency domains of the first UE and second UE. These shared resources include transmission of the same data to the first UE and second UE.

In some of these embodiments, the first PDSCH and second PDSCH are scheduled by Downlink Control Information (DCI) mapping to a Physical Downlink Control Channel (PDCCH). In some of these embodiments, the shared resources overlap at least in part with a frequency range of resources of the PDCCH transmission, the shared resources include a bandwidth of the PDCCH, or the shared resources have a bandwidth that is same as the bandwidth of the PDCCH. In other of these embodiments, at least one of: a) an indication of the shared resources between the first resource set and the second resource set; b) an indication that the PDCCH is shared to schedule the first PDSCH transmission and the second PDSCH transmission; or c) a position of the shared resources, is determined according to: a) a predefined or a default setting; or b) an indication in the DCI, a Radio Resource Control (RRC) signaling or a Medium Access Control Control Element (MAC CE) signaling, from the BS to the first UE and the second UE.

In some of these embodiments, the shared resources include a first bandwidth, and a bandwidth of the first resource set is no more than the first bandwidth. In other of these embodiments, remaining resources of the first resource set are determined by the shared resources, or the shared resources and the second resource set. In yet other of these embodiments, the first resource set and the second resource set have a same Transport Block Size (TBS) or a same number of Resource Elements (REs).

In some embodiments, the first resource set is mapped onto Y portions in time domain, where resources in each of the Y portions are allocated: a) in one slot; b) in one slot with one repetition; c) in multiple slots with one repetition; or d) in M slots with N repetitions, where M and N are each a positive integer value, and M is greater than or equal to N. In some of these embodiments, Y is determined by L and X, where L is a bandwidth of second resource set, and where X is a bandwidth of shared resources between the first resource set and the second resource set. Y may be determined as L/X.

In other of these embodiments, the Y portions in the time domain are continuous with respect to each other, or there may be a gap is present between each pair of adjacent portions from the Y portions. In yet other of these embodiments, DCI, RRC signaling, or MAC CE signaling is used to configure or indicate that: a) the Y portions in the time domain are continuous with respect to each other; or b) a gap is to be present between each pair of adjacent portions from the Y portions. In further of these embodiments, DCI, RRC signaling, or MAC CE signaling is used to configure or indicate a value of the gap based on number of slots, milliseconds (ms), or symbols. In some embodiments, each of the Y portions has same symbol positions in a corresponding slot or multiple slots, and in other embodiments, each of the Y portions has a same bandwidth.

In some embodiments, the method 1600 further includes mapping symbols to a third resource set with M portions according to at least one of a portion index, a subcarrier index, or a symbol index. These symbols include complex-valued symbols, modulation symbols, sequences, etc. In some of these embodiments, the mapping of symbols includes: a) increasing the subcarrier index with a starting symbol in a starting portion, then increasing the symbol index, and then increasing the portion index; or b) increasing the subcarrier index with the starting symbol in the starting portion, then increasing the portion index, and then increasing the symbol index. In other of these embodiments, the M portions are continuous or a gap is present between each pair of adjacent portions of the M portions.

In yet other of these embodiments, the M portions of the third resource set in the time domain correspond to M portions of a fourth resource set in the frequency domain, and each corresponding pair of portions from the third resource set and the forth resource set has a same bandwidth and a same number of symbols as each other. In some of these embodiments, M is determined by L and X, where L is a bandwidth of fourth resource set, and where X is a bandwidth of shared resources between the third resource set and the fourth resource set. Y may be determined as L/X.

In some embodiments, the first PDSCH is transmitted with repetitions in different slots. In some of these embodiments, the first resource set is mapped onto Y portions in the time domain, where Y is determined by L and X. L is a bandwidth of the second resource set, and X is a first bandwidth of shared resources between the first resource set and the second resource set. In some of these embodiments, the shared resources contain resources within the first bandwidth across multiple slots or repetitions. Different portions of the first resource set may be in consecutive slots, or a gap may be present between each pair of adjacent portions of the first resource set. In some of these embodiments, all but the last portion of the Y portions have the same pattern in the time domain and in the frequency domain as each other, with the last portion having the same or a different pattern.

In some embodiments, the method 1600 further includes configuring a fourth BWP to the first UE to be used for transmission of a unicast transmission for the first UE. In other embodiments, the method 1600 further includes transmitting a first MCCH change notification and a second MCCH change notification in (the same) DCI. The first MCCH change notification is for the second UE, and the second MCCH change notification is for the first UE.

Figure 16B:
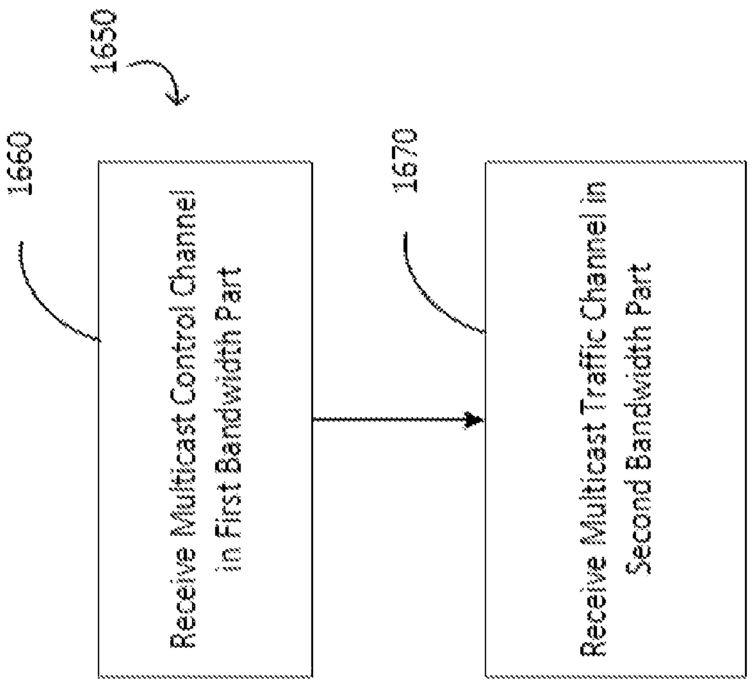
FIG. 16B is a flowchart diagram illustrating another example wireless communication method for multicast transmission on a reduced capability user equipment, according to various embodiments.

FIG. 16B is a flowchart diagram illustrating an example wireless communication method 1650, according to various arrangements. Method 1650 can be performed by a first UE, and begins at 1660 where the UE receives a MCCH in a first BWP. At 1670, the UE then receives a MTCH in a second BWP. The UE receives the MCCH or the MTCH via a configuration.

In some embodiments, the first BWP is shared between the first UE and a second UE for transmission of a MCCH for the second UE. In other embodiments, the second BWP is shared between the first UE and a second UE for transmission of a MTCH for the second UE. In some of these embodiments, the method 1650 further includes receiving a first PDSCH transmission on a first resource set. The second UE then may receive a second PDSCH transmission on a second resource set that at least partially shares resources with the first resource set in the time and frequency domains of the first UE and the second UE. The shared resources include transmission of the same data to the first UE and second UE.

In some of these embodiments, the method 1650 further includes receiving, from the BS, a second MCCH change notification in DCI. The second UE may also receive, from the BS in DCI, a first MCCH change notification. The first MCCH change notification and the second MCCH change notification are indicated in the same DCI with 2 separate fields. In other of these embodiments, the method 1650 further includes mapping to a third resource set with M portions according to at least a portion index, a subcarrier index and a symbol index.

Figure 17:
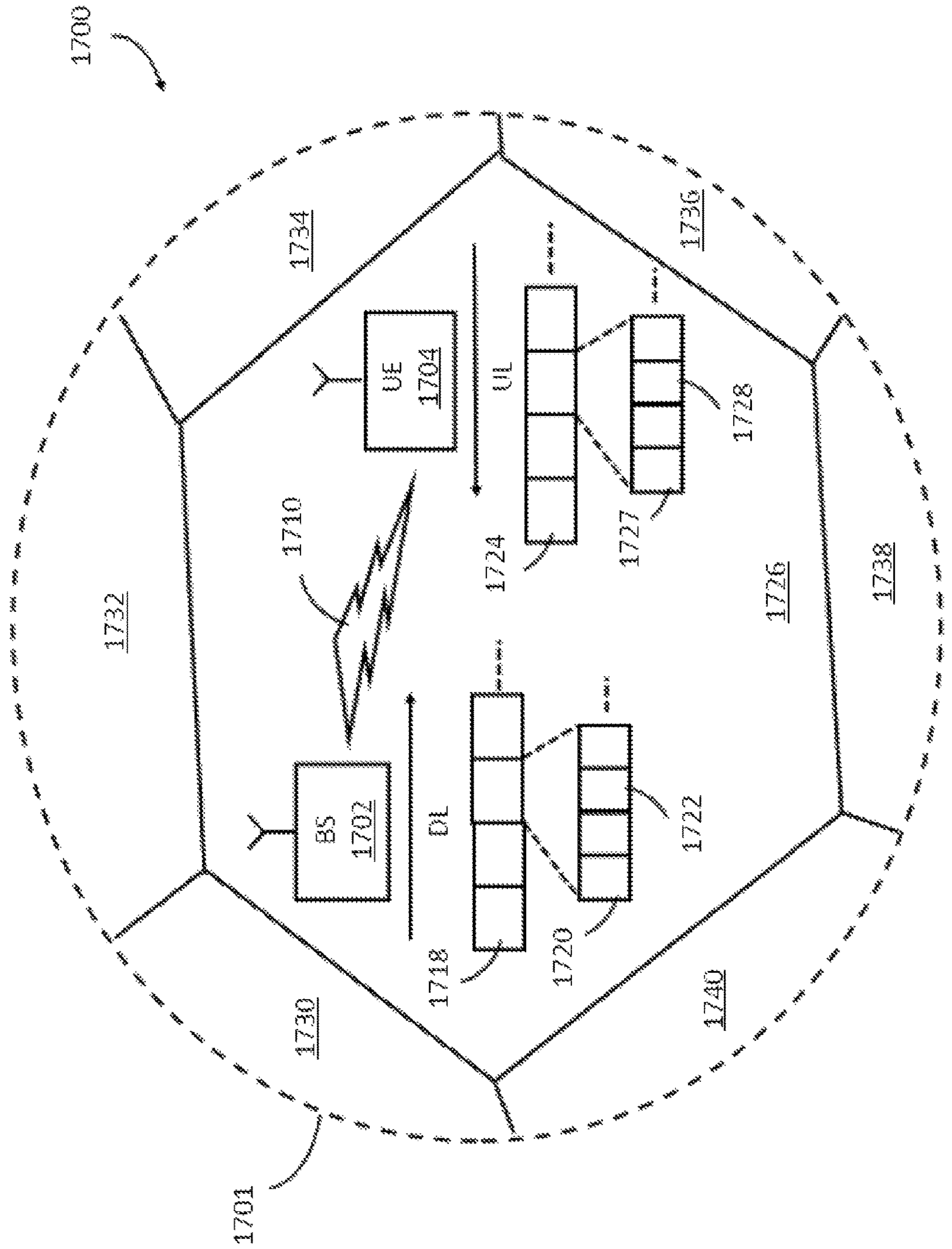
FIG. 17 is an example cellular communication network in which techniques disclosed herein may be implemented, according to various embodiments.

FIG. 17 illustrates an example wireless communication network, and/or system, 1700 in which techniques disclosed herein may be implemented, in accordance with an embodiment of the present disclosure. In the following discussion, the wireless communication network 1700 may be any wireless network, such as a cellular network or a narrowband Internet of things (NB-IoT) network, and is herein referred to as "network 1700." Such an example network 1700 includes a base station 1702 (hereinafter "BS 1702"; also referred to as wireless communication node) and a user equipment device 1704 (hereinafter "UE 1704"; also referred to as wireless communication device) that can communicate with each other via a communication link 1710 (e.g., a wireless communication channel), and a cluster of cells 1726, 1730, 1732, 1734, 1736, 1738 and 1740 overlaying a geographical area 1701. In FIG. 17, the BS 1702 and UE 1704 are contained within a respective geographic boundary of cell 1726. Each of the other cells 1730, 1732, 1734, 1736, 1738 and 1740 may include at least one base station operating at its allocated bandwidth to provide adequate radio coverage to its intended users.

For example, the BS 1702 may operate at an allocated channel transmission bandwidth to provide adequate coverage to the UE 1704. The BS 1702 and the UE 1704 may communicate via a downlink radio frame 1718, and an uplink radio frame 1724 respectively. Each radio frame 1718/1724 may be further divided into sub-frames 1720/127 which may include data symbols 1722/1728. In the present disclosure, the BS 1702 and UE 1704 are described herein as non-limiting examples of "communication nodes," generally, which can practice the methods disclosed herein. Such communication nodes may be capable of wireless and/or wired communications, in accordance with various embodiments of the present solution.

Figure 18:
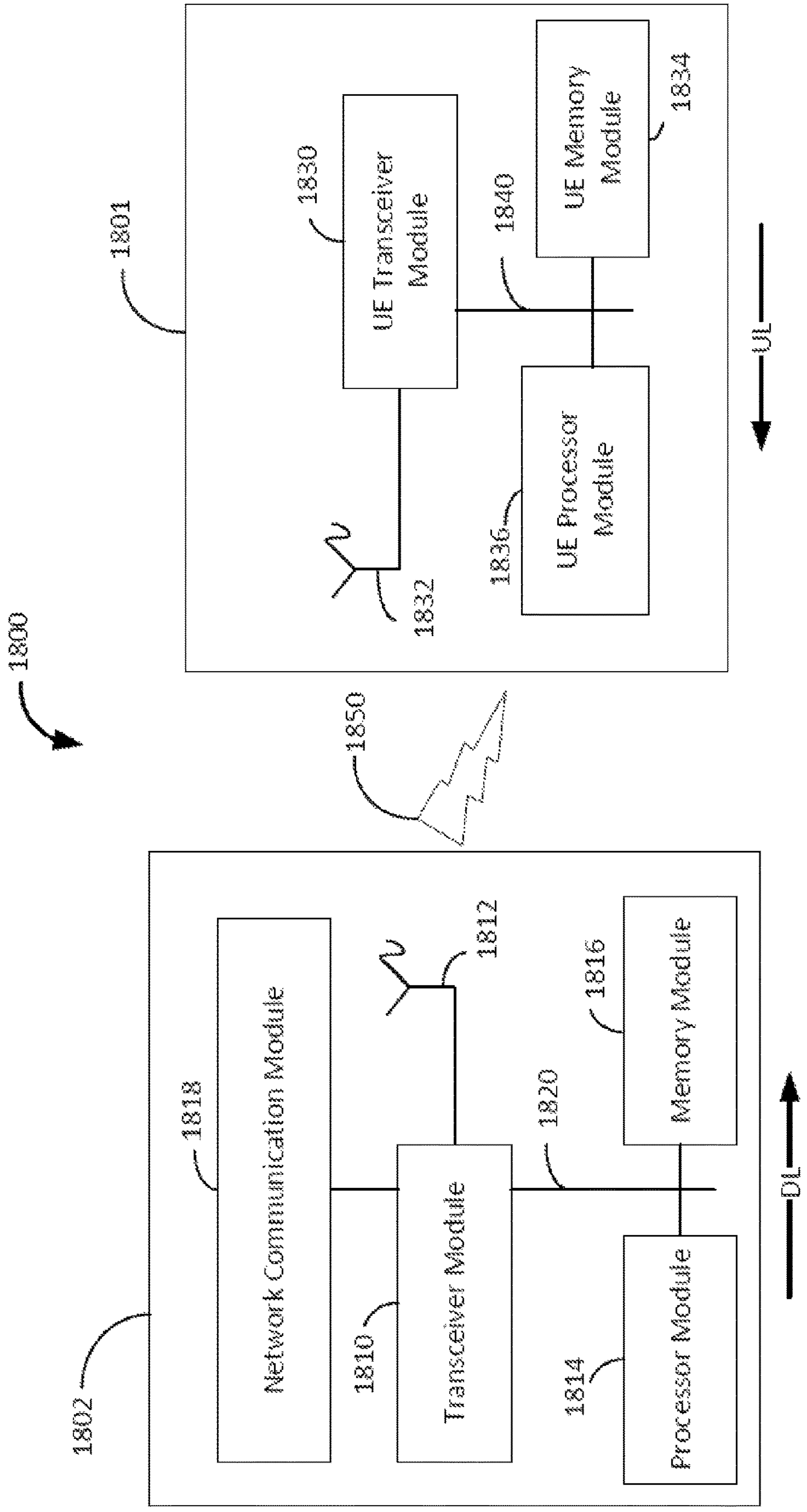
FIG. 18 illustrates a block diagram of an example base station and a user equipment device, according to various embodiments.

FIG. 18 illustrates a block diagram of an example wireless communication system 1800 for transmitting and receiving wireless communication signals (e.g., OFDM/OFDMA signals) in accordance with some embodiments of the present solution. The system 1800 may include components and elements configured to support known or conventional operating features that need not be described in detail herein. In one illustrative embodiment, system 1800 can be used to communicate (e.g., transmit and receive) data symbols in a wireless communication environment such as the wireless communication environment 100 of FIG. 1, as described above.

System 1800 generally includes a base station 1802 (hereinafter "BS 1802") and a user equipment device 1804 (hereinafter "UE 1804"). The BS 1802 includes a BS (base station) transceiver module 1810, a BS antenna 1812, a BS processor module 1814, a BS memory module 1816, and a network communication module 1818, each module being coupled and interconnected with one another as necessary via a data communication bus 1820. The UE 1804 includes a UE (user equipment) transceiver module 1830, a UE antenna 1832, a UE memory module 1834, and a UE processor module 1836, each module being coupled and interconnected with one another as necessary via a data communication bus 1840. The BS 1802 communicates with the UE 1804 via a communication channel 1850, which can be any wireless channel or other medium suitable for transmission of data as described herein.

As would be understood by persons of ordinary skill in the art, system 1800 may further include any number of modules other than the modules shown in FIG. 18. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 1830 may be referred to herein as an "uplink" transceiver 1830 that includes a radio frequency (RF) transmitter and a RF receiver each comprising circuitry that is coupled to the antenna 1832. A duplex switch (not shown) may alternatively couple the uplink transmitter or receiver to the uplink antenna in time duplex fashion. Similarly, in accordance with some embodiments, the BS transceiver 1810 may be referred to herein as a "downlink" transceiver 1810 that includes a RF transmitter and a RF receiver each comprising circuitry that is coupled to the antenna 1812. A downlink duplex switch may alternatively couple the downlink transmitter or receiver to the downlink antenna 1812 in time duplex fashion. The operations of the two transceiver modules 1810 and 1830 may be coordinated in time such that the uplink receiver circuitry is coupled to the uplink antenna 1832 for reception of transmissions over the wireless transmission link 1850 at the same time that the downlink transmitter is coupled to the downlink antenna 1812. Conversely, the operations of the two transceivers 1810 and 1830 may be coordinated in time such that the downlink receiver is coupled to the downlink antenna 1812 for reception of transmissions over the wireless transmission link 1850 at the same time that the uplink transmitter is coupled to the uplink antenna 1832. In some embodiments, there is close time synchronization with a minimal guard time between changes in duplex direction.

The UE transceiver 1830 and the base station transceiver 1810 are configured to communicate via the wireless data communication link 1850, and cooperate with a suitably configured RF antenna arrangement 1812/1832 that can support a particular wireless communication protocol and modulation scheme. In some illustrative embodiments, the UE transceiver 1810 and the base station transceiver 1810 are configured to support industry standards such as the Long Term Evolution (LTE) and emerging 5G standards, and the like. It is understood, however, that the present disclosure is not necessarily limited in application to a particular standard and associated protocols. Rather, the UE transceiver 1830 and the base station transceiver 1810 may be configured to support alternate, or additional, wireless data communication protocols, including future standards or variations thereof.

In accordance with various embodiments, the BS 1802 may be an evolved node B (eNB), a serving eNB, a target eNB, a femto station, or a pico station, for example. In some embodiments, the UE 1804 may be embodied in various types of user devices such as a mobile phone, a smart phone, a personal digital assistant (PDA), tablet, laptop computer, wearable computing device, etc. The processor modules 1814 and 1836 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 1814 and 1836, respectively, or in any practical combination thereof. The memory modules 1816 and 1834 may be realized as RAM memory, flash memory, ROM memory, EPROM memory, EEPROM memory, registers, a hard disk, a removable disk, a CD-ROM, or any other form of storage medium known in the art. In this regard, memory modules 1816 and 1834 may be coupled to the processor modules 1810 and 1830, respectively, such that the processors modules 1810 and 1830 can read information from, and write information to, memory modules 1816 and 1834, respectively. The memory modules 1816 and 1834 may also be integrated into their respective processor modules 1810 and 1830. In some embodiments, the memory modules 1816 and 1834 may each include a cache memory for storing temporary variables or other intermediate information during execution of instructions to be executed by processor modules 1810 and 1830, respectively. Memory modules 1816 and 1834 may also each include non-volatile memory for storing instructions to be executed by the processor modules 1810 and 1830, respectively.

The network communication module 1818 generally represents the hardware, software, firmware, processing logic, and/or other components of the base station 1802 that enable bi-directional communication between base station transceiver 1810 and other network components and communication nodes configured to communication with the base station 1802. For example, network communication module 1818 may be configured to support internet or WiMAX traffic. In a typical deployment, without limitation, network communication module 1818 provides an 802.3 Ethernet interface such that base station transceiver 1810 can communicate with a conventional Ethernet based computer network. In this manner, the network communication module 1818 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method, comprising:

configuring, by a wireless communication node, a first bandwidth part to a first wireless communication device, wherein a multicast control channel (MCCH) for the first wireless communication device is transmitted in the first bandwidth part, wherein the first bandwidth part is shared by the first wireless communication device with a second wireless communication device to transmit the MCCH; and configuring, by the wireless communication node, a second bandwidth part to the first wireless communication device, wherein a multicast traffic channel (MTCH) for the first wireless communication device is transmitted in the second bandwidth part, wherein at least one of the first bandwidth part, the second bandwidth part, or a third bandwidth part is shared by the first wireless communication device with the second wireless communication device, to transmit a MTCH for the second wireless communication device; and transmitting, by the wireless communication node, a first physical downlink shared channel (PDSCH) transmission on a first resource set to the first wireless communication device, and a second PDSCH transmission on a second resource set to the second wireless communication device, the first resource set includes at least a portion of shared resources with the second resource set in time domain and frequency domain of the first wireless communication device and the second wireless communication device, wherein the shared resources comprise a same data which is transmitted to the first wireless communication device and the second wireless communication device.

2. The method of claim 1, comprising:

configuring, by the wireless communication node, the third bandwidth part to the second wireless communication device, wherein a MTCH for the second wireless communication device is transmitted in the third bandwidth part.

3. The method of claim 1, wherein the first bandwidth part is shared between the first wireless communication device and the second wireless communication device, to transmit the MTCH for the second wireless communication device.

4. The method of claim 1, wherein the second bandwidth part is shared between the first wireless communication device and the second wireless communication device, to transmit the MTCH for the second wireless communication device.

5. The method of claim 1, wherein the first PDSCH transmission and the second PDSCH transmission are scheduled by downlink control information (DCI) mapping to a physical downlink control channel (PDCCH).

6. The method of claim 5, wherein:

the shared resources overlap at least in part with a frequency range of resources of the PDCCH, or the shared resources include a bandwidth of the PDCCH, or the shared resources have a bandwidth that is same as the bandwidth of the PDCCH.

7. The method of claim 5, wherein at least one of: an indication of the shared resources between the first resource set and the second resource set, an indication that the PDCCH is shared to schedule the first PDSCH transmission and the second PDSCH transmission, or a position of the shared resources, is determined according to:

a predefined or a default setting, or an indication in the DCI, a radio resource control (RRC) signaling or a medium access control control element (MAC CE) signaling, from the wireless communication node to the first wireless communication device and the second wireless communication device.

8. The method of claim 1, wherein:

the shared resources comprise a first bandwidth, and a bandwidth of the first resource set is no more than the first bandwidth.

9. The method of claim 1, wherein remaining resources of the first resource set are determined by:

the shared resources, or the shared resources and the second resource set.

10. The method of claim 1, wherein the first resource set and the second resource set have a same transport block size (TBS) or a same number of resource elements (REs).

11. The method of claim 1, wherein:

the first resource set is mapped onto Y portions in time domain, where resources in each of the Y portions are allocated:

in one slot or in one slot with one repetition, or in multiple slots with one repetition, or in M slots with N repetitions, where M and N are each a positive integer value, and M is greater than or equal to N.

12. The method of claim 11, wherein:

Y is determined by L and X,

L is a bandwidth of second resource set, and

X is a bandwidth of shared resources between the first resource set and the second resource set.

13. The method of claim 12, wherein:

$$Y=[L/X].$$

14. The method of claim 11, wherein the Y portions in the time domain are continuous with respect to each other.

15. The method of claim 11, wherein a gap is present between each pair of adjacent portions from the Y portions.

16. A method, comprising:

receiving, by a first wireless communication device from a wireless communication node, a first physical downlink shared channel (PDSCH) transmission on a first resource set, and a second PDSCH transmission on a second resource set to the second wireless communication device, the first resource set includes at least a portion of shared resources with a second resource set on which a second PDSCH transmission is transmitted to a second wireless communication device, wherein the shared resources are in time domain and frequency domain of the first wireless communication device and the second wireless communication device, wherein the shared resources comprise a same data which is transmitted by the wireless communication node to the first wireless communication device and the second wireless communication device;

receiving, by the first wireless communication device, a multicast control channel (MCCH) in a first bandwidth part, the first bandwidth part configured for the first wireless communication device, wherein the first bandwidth part is shared by the first wireless communication device with the second wireless communication device; and receiving, by the first wireless communication device, a multicast traffic channel (MTCH) in a second bandwidth part configured for the first wireless communication device, wherein at least one of the first bandwidth part, the second bandwidth part, or a third bandwidth part is shared by the first wireless communication device with the second wireless communication device, to transmit a MTCH for the second wireless communication device.

17. A wireless communication node, comprising:

at least one processor configured to:

configure a first bandwidth part to a first wireless communication device comprising a reduced capability device, wherein a multicast control channel (MCCH) for the first wireless communication device is transmitted in the first bandwidth part, wherein the first bandwidth part is shared by the first wireless communication device with a second wireless communication device to transmit the MCCH;

configure a second bandwidth part to the first wireless communication device, wherein a multicast traffic channel (MTCH) for the first wireless communication device is transmitted in the second bandwidth part, wherein at least one of the first bandwidth part, the second bandwidth part, or a third bandwidth part is shared by the first wireless communication device with the second wireless communication device, to transmit a MTCH for the second wireless communication device; and transmit, via a transmitter, a first physical downlink shared channel (PDSCH) transmission on a first resource set to the first wireless communication device, and a second PDSCH transmission on a second resource set to the second wireless communication device, the first resource set includes at least a portion of shared resources with the second resource set in time domain and frequency domain of the first wireless communication device and the second wireless communication device, wherein the shared resources comprise a same data which is transmitted to the first wireless communication device and the second wireless communication device.

18. A first wireless communication device, comprising:

at least one processor configured to:

receive, via a receiver from a wireless communication node, a first physical downlink shared channel (PDSCH) transmission on a first resource set, and a second PDSCH transmission on a second resource set to the second wireless communication device, the first resource set includes at least a portion of shared resources with a second resource set on which a second PDSCH transmission is transmitted to a second wireless communication device, wherein the shared resources are in time domain and frequency domain of the first wireless communication device and the second wireless communication device, wherein the shared resources comprise a same data which is transmitted by the wireless communication node to the first wireless communication device and the second wireless communication device;

receive, via the receiver, a multicast control channel (MCCH) in a first bandwidth part, the first bandwidth part configured for the reduced capability device, wherein the first bandwidth part is shared by the first wireless communication device with the second wireless communication device; and receive, via the receiver, a multicast traffic channel (MTCH) in a second bandwidth part configured for first wireless communication device, wherein at least one of the first bandwidth part, the second bandwidth part, or a third bandwidth part is shared by the first wireless communication device with the second wireless communication device, to transmit a MTCH for the second wireless communication device.

* * * * *